United States Patent [19]

Lamb et al.

[11] Patent Number: 4,693,373

[45] Date of Patent: Sep. 15, 1987

[54] SLIDE ARCHIVAL STORAGE AND RETRIEVAL SYSTEM

[75] Inventors: Owen L. Lamb, Scotts Valley; William R. Maclay, Los Gatos, both of Calif.

[73] Assignee: Slide Management Systems, Inc., Los Gatos, Calif.

[21] Appl. No.: 730,306

[22] Filed: Jun. 12, 1985

[51] Int. Cl.⁴ .................. B07C 5/00; G02B 27/02; B65H 31/24

[52] U.S. Cl. .................. 209/3.3; 40/361; 209/564; 209/583; 353/112; 353/113; 364/478; 414/32; 414/47

[58] Field of Search ............. 209/509, 546, 547, 552, 209/563–566, 569, 583, 606, 698, 702, 703, 706, 914, 938, 942, 3.3; 40/361, 508, 509; 235/375, 475, 476, 479, 481; 353/103, 111–113, 122, DIG. 1; 364/478; 414/32, 47, 51, 53

[56] References Cited

U.S. PATENT DOCUMENTS

| | | | |
|---|---|---|---|
| 3,096,882 | 7/1963 | Tyler | 209/569 |
| 3,472,584 | 10/1969 | Arens | 353/113 X |
| 3,550,770 | 12/1970 | Lund | 209/583 |
| 3,556,650 | 1/1971 | Pennock, Jr. | 353/122 X |
| 3,714,396 | 1/1973 | Stambler | 235/481 X |
| 3,731,060 | 5/1973 | Weinstein | 209/583 |
| 3,757,944 | 9/1973 | Goodman | 209/583 |
| 3,800,942 | 4/1974 | Hirata et al. | 209/546 X |
| 4,024,966 | 5/1977 | Schenck | 353/112 X |
| 4,249,329 | 2/1981 | Lamb | 209/606 X |
| 4,250,028 | 2/1981 | Talyzin et al. | 209/583 |
| 4,301,929 | 11/1981 | Fitzgerald et al. | 209/3.1 X |
| 4,338,738 | 7/1982 | Lamb | 353/111 X |
| 4,485,611 | 12/1984 | Fuller | 353/112 X |
| 4,519,522 | 5/1985 | McElwee | 235/462 X |

FOREIGN PATENT DOCUMENTS 3424799 1/1985 Fed. Rep. of Germany ...... 353/103

*Primary Examiner*—Robert B. Reeves
*Assistant Examiner*—Edward M. Wacyra
*Attorney, Agent, or Firm*—Owen L. Lamb

[57] ABSTRACT

A computer-controlled slide previewer, sorter, projector tray loader and archiving system. Slides are held in a stack in a hopper in a known sequence. A slide release mechanism is provided to deliver one slide from the stack of slides to a position over one of a plurality of sorting bins or compartments of a projector tray. An accession number is derived for each slide either from a number read from a label affixed to the slide or from the relative position of the slide in the hopper. This accession number is transmitted to a sorting logic. In accordance with a sort algorithm using the accession number, the sorting logic positions the appropriate bin or compartment to receive the slide. The sorting logic then activates the release mechanism to deliver the slide into the bin or compartment positioned to receive the slide. The computer records the number of the bin or projector tray, the slide's accession number, and the relative position of the slide in the bin (or projector tray) for use in future retrieval of the slide.

27 Claims, 41 Drawing Figures

SLIDE ARCHIVAL STORAGE AND RETRIEVAL SYSTEM

BACKGROUND OF THE INVENTION

The present invention relates to computer peripheral devices and more particularly to an apparatus for performing photographic slide handling functions automatically under computer control.

According to prior studies published by Hope Reports, a marketing research firm in Rochester, N.Y., 2×2 inch slides are primary audiovisual (AV) medium. Slides are basic and fundamental, a standard tool for a speech, a presentation, a training session, or other communication function. They offer convenience, flexibility, low capital investment, quick production turnaround, ease in updating, sophisticated effects when required, yet demand less technical training and manpower than other AV media.

There have been great strides made in the generation of slide transparencies by computer graphics. Furthermore, slide projectors have been automated with computer controllers for multi-image, multi-projector slide shows. The area that has been neglected is in the handling of the slides.

There has been a long-felt need in the AV industry for a cost-effective way to edit slides, store and retrieve them, and assemble slide programs for projection. All of these labor-intensive functions are done manually today. According to Hope Reports, misordering and inverted images are the most common projection errors. Hope Reports has states that:

The chief remaining roadblock for slides has been related to slide handling. This includes storage and retrieval as well as sorting and tray-loading for projection.

Prior devices do exist for automating some slide handling functions. In U.S. Pat. No. 4,249,329, "Apparatus for Viewing and Sorting Photographic Slide Transparencies," granted on Feb. 10, 1981 to Owen L. Lamb, there is described an apparatus for viewing and sorting photographic slides into storage bins. In U.S. Pat. No. 4,338,738, "Slide Previewer and Tray Loader," granted on July 13, 1982 to Owen L. Lamb, there is described a mechanism by which slides may be previewed and sorted into compartments of a circular slide tray. These devices still require a substantial amount of manual slide handling, and do not provide for the storage and retrieval of slides.

The primary object of the present invention is to provide a computer-controlled automatic slide handling system.

A further object of the invention is to provide an improved apparatus which will enable one to quickly sort through slides in storage to find particular slides, preview the slides, load them into a tray for projection, and after projection, to rapidly return the slides to their original storage place for future retrieval.

DISCLOSURE OF THE INVENTION

Briefly, the above objects are accomplished in accordance with a preferred embodiment of the invention by providing a movable sorting table having a plurality of slide receptacles thereon. A hopper holds a group of slides in a stack above the table, and delivers slides one by one to a position above the sorting table. Each individual slide within the stack is identified by generating an ID number for each slide as the slide is delivered from the hopper. The ID number may be determined by the relative position of the slide within the stack or may be a number read from a coded number on the slide transparency itself or the slide mount. A computer utilizes the slide's ID number in accordance with a sorting algorithm to move the sorting table to position a particular slide receptacle relative to the slide's position above the sorting table. The slide receptacle may be either a slide bin or the compartment of a slide projector tray.

In accordance with an aspect of the invention, a first electronically readable code that distinguishes a particular slide from others of similar slides is affixed to the slide. A second electronically readable code is affixed to a slide storage module having a plurality of storage receptacles, such as bins for holding stacks of slides or a projector slide tray. The slide is moved past a first code-reading station and the slide-storage module is moved to a home-limit position such that the second electronically readable code is readable by a second code-reading station. The first electronically readable code is read as the slide passes the first code-reading station to thereby produce a first digital signal. The second electronically readable code is read as the slide-storage module is positioned with respect to the second code-reading station to thereby produce a second digital signal. The first digital signal is utilized in a sorting logic to index the storage module from the home-limit position to one particular storage receptacle of the plurality of storage receptacles in accordance with a prescribed sorting agenda. The particular slide is then placed in the one particular storage receptacle.

In accordance with another aspect of the invention, the second digital signal is used in conjunction with the first digital signal to produce a digital record indicating that the particular slide is stored in the one particular storage receptacle.

The invention has the advantage that one can electronically sort through an index of the slides stored in a computer by slide ID number and subject matter, or sort through the physical slides themselves, including reading the slide ID number, making the slide available for previewing, editing, and A-B comparisons with another slide, and dropping the slides into selected archival storage bins, or different compartments of a slide projector tray.

Any slide storage and retrieval system should store slides safely to keep them from being damaged, but yet allow fast access to a particular slide or slides. This system meets both of these needs. Storing the slides in stacks in a bin is not only safe, but it is efficient, providing the most dense storage of slides possible. A storage cabinet holding a library of 10,000 slides fits easily on top of a desk. Access to the slides is fast, because each slide within a module is identified by a unique ID or accession number. This accession number is obtained either by indexing to the slide's position within the module to produce a number or by a unique identification number affixed to the slide. The accession number can be used with a computer-search system to locate a particular slide at computer speeds without going to the physical location of the slide in the slide storage system.

BRIEF DESCRIPTION OF THE DRAWINGS

The foregoing and other objects, features, and advantages of the invention will be apparent from the following detailed description of preferred embodiments of the invention as illustrated in the accompanying drawings wherein.

TABLE OF CONTENTS 1.0 Overall System
2.0 Slide Storage
   2.1 Slide Storage Bins
   2.2 Bin Sorting Nest
3.0 Slide Information Retrieval
   3.1 Slide Bin ID number Code
   3.2 Slide ID number Code
   3.3 Slide/bin/Circular tray Code Readers
   3.4 Computer Search System
4.0 Slide Editing
   4.1 The Slide Editing Console
   4.2 Dual-mode Latch Mechanism
   4.3 Projector tray Loading Mode
   4.4 Slide Hopper Operation
   4.5 A-B Comparison of Slides
   4.6 Slide Sort Mode
   4.7 Projector Tray Load Mode
5.0 Computer Control
   5.1 Electronic Computer Interface
   5.2 Computer Software
      5.2.1 Introduction and Terminology
      5.2.2 Computer Operations Menu
      5.2.3 Slide Handling Menu

DESCRIPTION

1.0 Overall System

Figure 1:
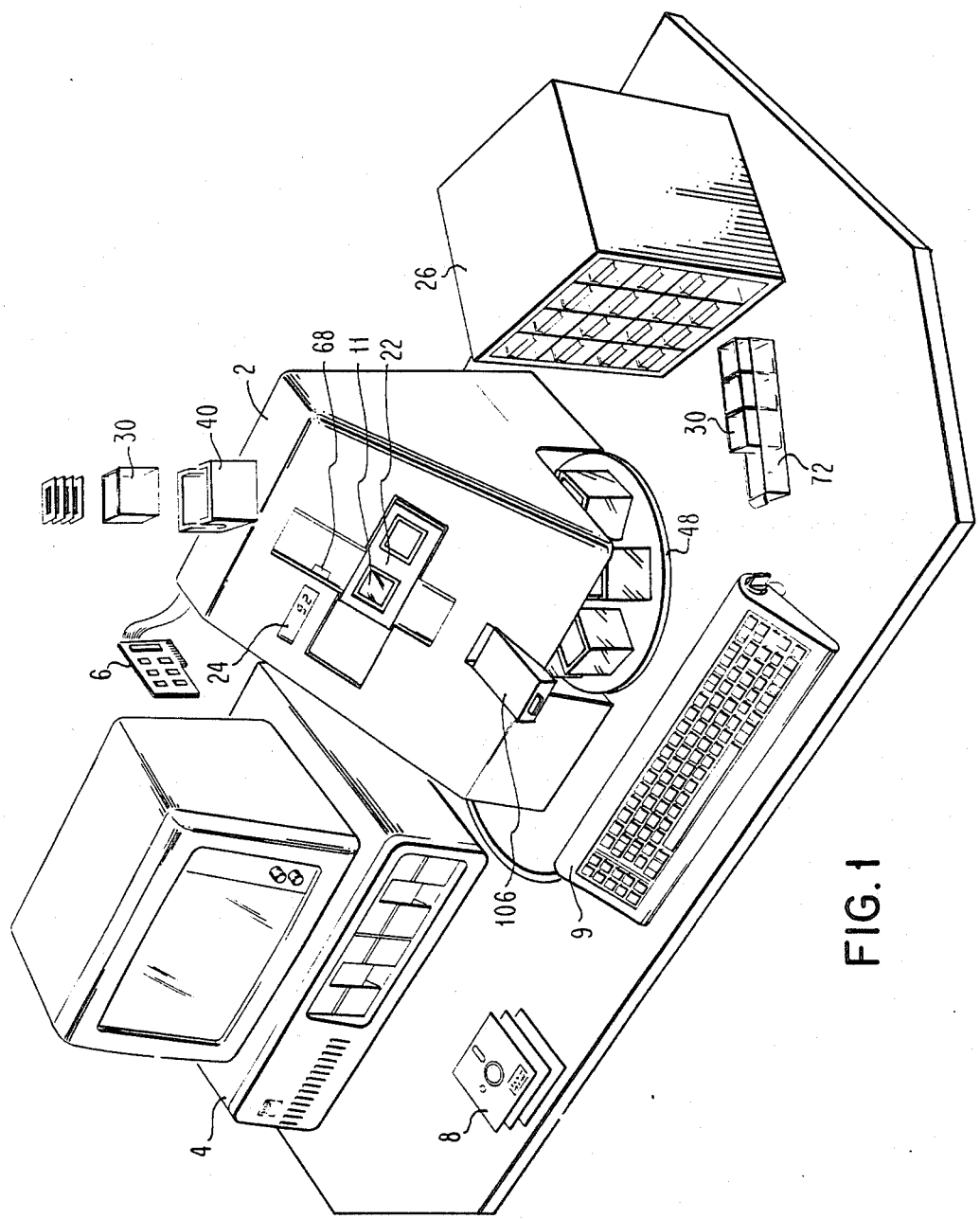
FIG. 1 is a perspective view of a slide archival and retrieval system in which the present invention is embodied.

Referring to FIG. 1, the system is comprised of a slide editing console (2) which is attached to a computer (4) by means of hardware interface card (6) and software (8) which controls the console, through use of the computer keyboard (9). The editing console has a viewing station (11) where slides are back-lighted for viewing and an A-B comparison mechanism (22) to allow two slides to be compared. A turn-table (48) holds slide storage receptacles (bins or circular projector trays) for sorting and collating slides. A small display screen (24) is provided to display information such as slide ID number or status information. A slide storage cabinet (26) is provided to store the slides.

2.0 Slide Storage

2.1 Slide Storage Bins

Referring to FIG. 1, the basic storage component of the storage system is a plastic bin (30) which fits into a drawer (72). Each drawer will hold 4 bins. Each bin will hold 40 slides stacked one on top of the other. Each tray holds 40 times 4, or 160 slides. A Kodak Carousel TM 80-slide tray holds 80 slides; therefore, one drawer of four bins will hold the contents of two Carousel TM slide trays. Each drawer slides into a dust-free, enclosed storage cabinet (26).

Figure 7:
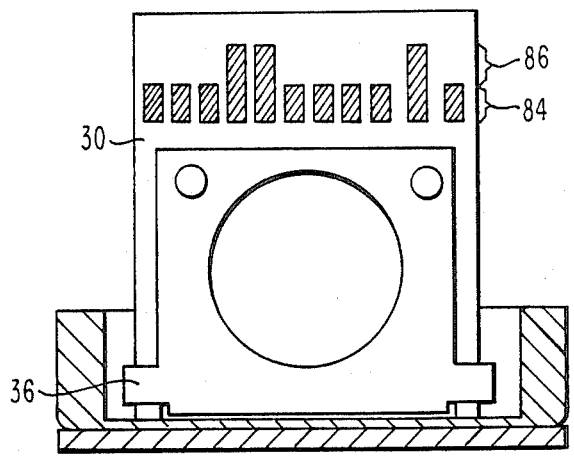
FIG. 7 is a section taken along view line 7—7 of FIG. 3.

Referring to FIG. 7, each bin (30) is open at the top and bottom. Slides are retained in the bins by means of metal tabs (32, 34) shows more clearly in FIG. 4. The tabs are spring loaded and can be spread apart by tines (36, 38) to open the way in the bottom of the bin when the bin is placed in the hopper (40) of FIG. 2.

An advantage of the drawer and bin combination is that the slides never need to be touched, as they are transported within the removable bin.

2.2 Bin Sorting Nest

Figure 3:
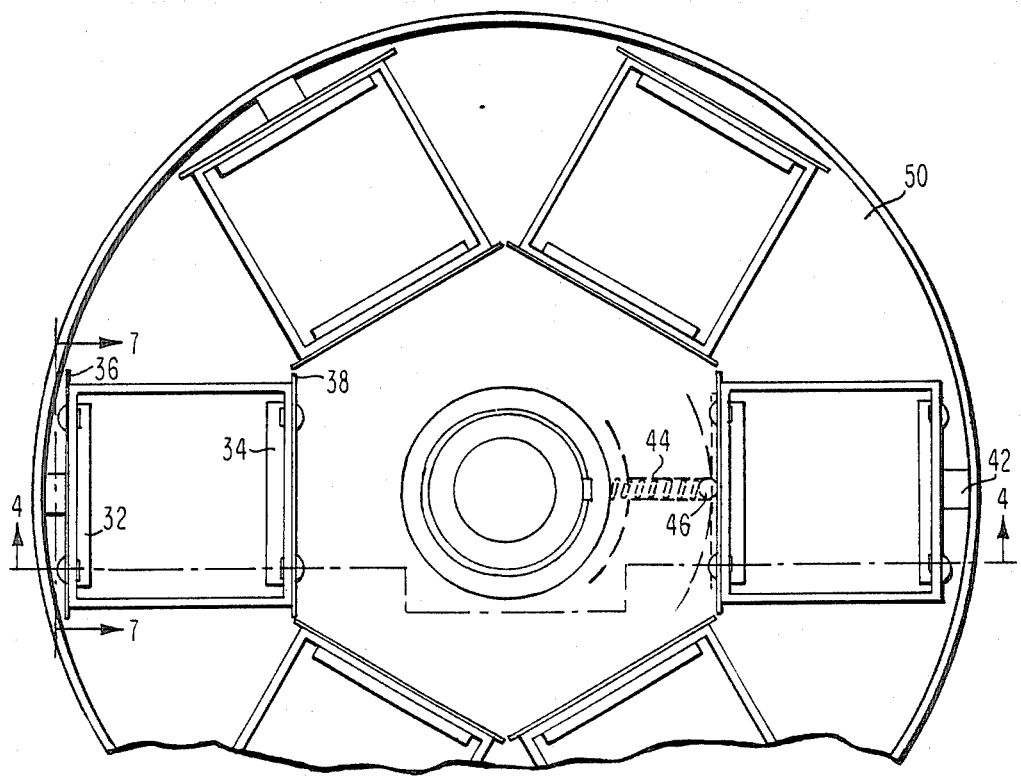
FIG. 3 is a top view of a rotary table with the storage bins in their nest.
Figure 4:
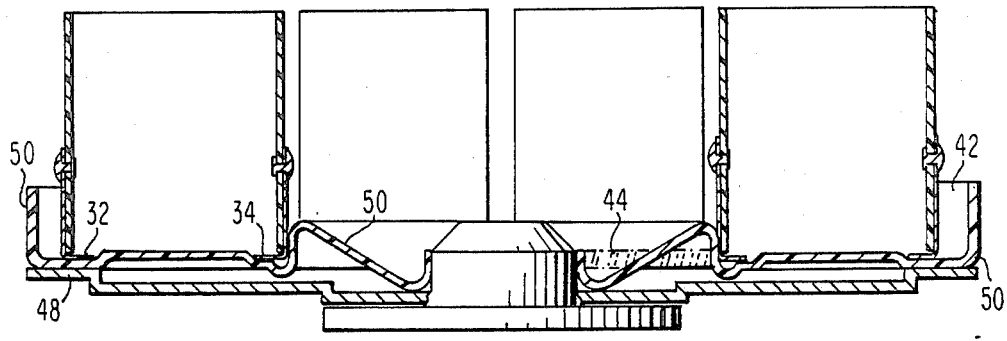
FIG. 4 is a section taken along view line 4—4 of FIG. 3.
Figure 10:
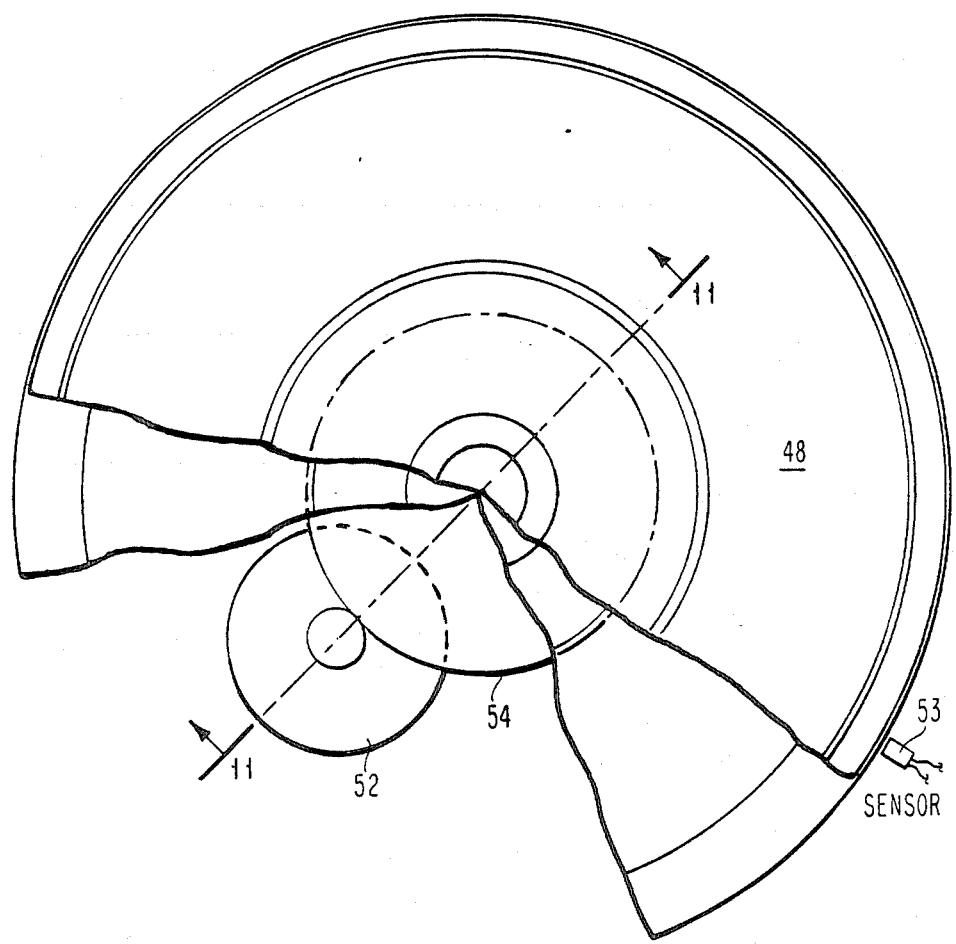
FIG. 10 is a top view of the turntable of FIG. 1 partially cut-away.
Figure 11:
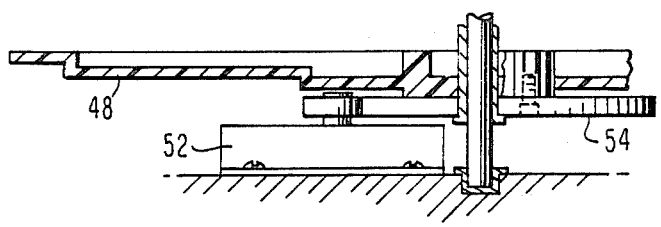
FIG. 11 is a section taken along view line 11—11 of FIG. 10.

Six slide bins fit into a circular bin nest (50) shows in FIGS. 3 and 4. The bins are held in place against stop (42) by the pressure of spring (44) and ball bearing (46), there being such an arrangement for each of the six bin positions of the nest. The nest fits on a turntable (48) which is driven by a motor (52) and gears (54) shown in FIGS. 10 and 11. The turntable is constructed to receive either a bin nest or a Kodak Carousel TM slide tray.

The bin nest is designed to be fabricated from a flat plastic sheet, vacuum formed. The bins themselves are cut to length from square extruded plastic stock.

While the system is described with reference to circular trays and bin nests, it should be understood that the invention can be modified to operate with linear trays and linear bin nests as well.

3.0 Slide Information Retrieval

3.1 Slide bin ID number Code

Refer to FIG. 7. In the preferred embodiment of the invention, each bin (30) has a computer-readable coded label (84, 86), which is used to uniquely identify the bin, and in one mode of operation, identify by indexing each slide stored in the bin. An optical hopper-bin reader (60) at the hopper (40) of FIG. 2, reads the ID number of the bin loaded into the hopper. An optical bin reader (64) at the bin (30) of FIG. 2, reads the ID number of the bins as the bins are positioned under the chute (66). The code readers are described in section 3.3 below.

3.2 Slide ID number Code

Figure 5:
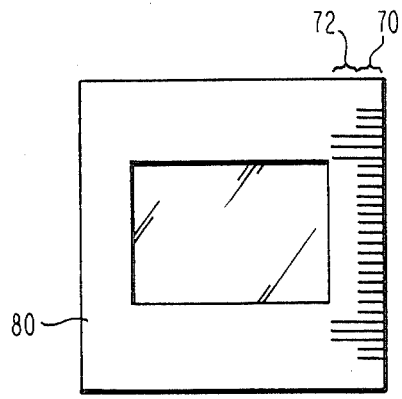
FIG. 5 is a view of a photographic slide transparency with a slide ID number in binary code thereon.

As shown in FIG. 5, in the preferred embodiment of the invention, each slide carries a machine-readable identification (ID) code (70, 72) by which the user assigns a unique number to each slide. It should be understood, however, that the principles of the invention can be practiced by utilizing the bin ID code described above and indexing instead of using a slide ID number, thus avoiding having to physically place an ID code on each slide. In the preferred embodiment of the invention both slide ID code and indexing are used, one being a check on the other.

The slide ID number may be printed on the slide or preferably may be printed on an adhesive label that can be attached to the slide. One full byte of error detection is provided in the preamble and postamble, and are both sensed by the reading circuit of FIG. 17. The sync track mark spacing is preferably 0.064±0.012 inches.

Alternatively, the slide code may be placed on the transparency itself by photographic or other techniques.

The slide code is optically read during sorting by the slide code reader (68) located on the chute (66) for entry into the computer. The computer software uses the bin code ID to generate an accession number which uniquely identifies the slide and a data file created for that slide. The unique slide accession number is derived by adding an index number to the bin code number and using the derived number as a pointer to a table of slide accession number.

3.3 Slide/bin/Circular tray Code Readers

Figure 6:
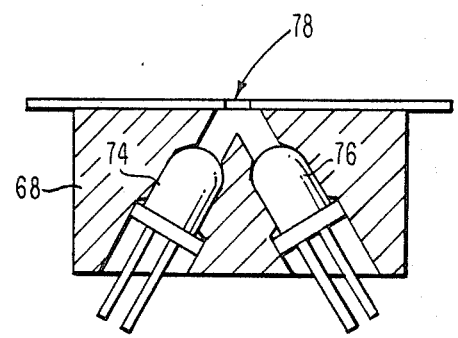
FIG. 6 a cut-away view of the slide-code reader shown in FIG. 1.

Referring now to FIG. 6, the slide code reader (68) is comprised of two code reading elements placed side-by-side, one to read the timing track (70) and one to read the data track (72), shown in FIG. 5. Each reading element in FIG. 6 is comprised of an infra-red sensor (74) and an infra-red lamp (76) which are focussed at an opening (78) in the sensor housing. As the slide (80) shown in FIG. 5 with the code thereon passes over the opening (78), the lamp (76) illuminates the appropriate portion of the code (data or timing track) which reflects onto the sensor (74).

A similar code reader, bin code reader (64), is used to sense the bin code timing track (84) and the bin code data track (86) of the bin code shown in FIG. 7 as the bin is moved into position under the chute. The bin code reader is comprised of two code reading elements (88, 90), located side-by-side, one to read the timing track (84) and one to read the data track (86).

Figure 13:
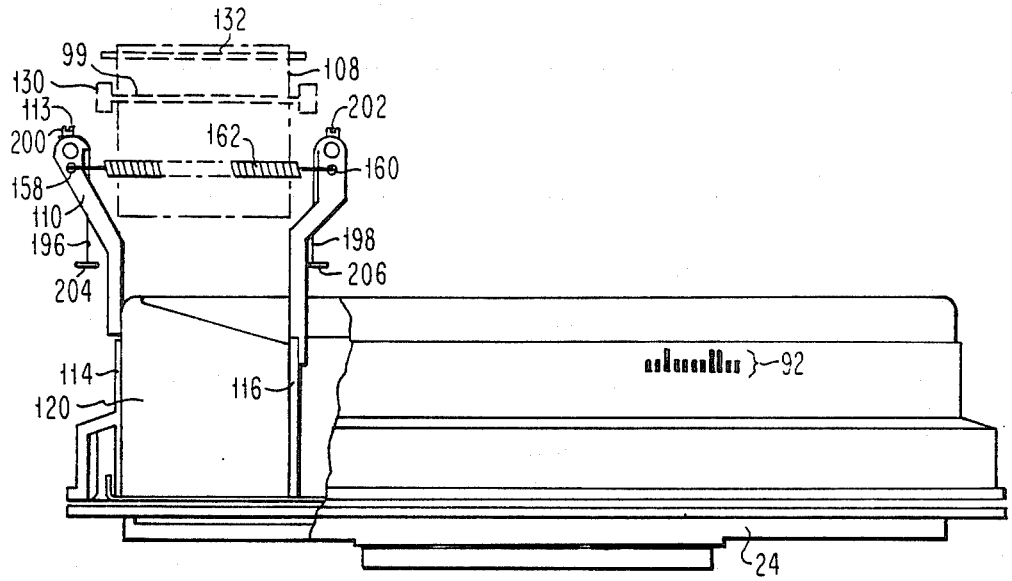
FIG. 13 is a partial front view of the mechanism of FIG. 2 with the projector tray in place.

Code reader (64) is also used to read a projector tray code (92) affixed to the circular tray projector tray (shown in FIG. 13).

Each of the above code readers read the code serially while the coded information passes by the code reader. The hopper bin reader (60) on the hopper (40) reads the bin code of a stationary bin that is placed in the hopper. Eleven reading elements similar to the one shown in FIG. 6 are used to sense the eleven bit positions of the data track (86) of the bin code shown in FIG. 7 when the bin is in the hopper. It is not necessary to read the timing track (84) because the bin is held stationary during reading.

Figure 17:
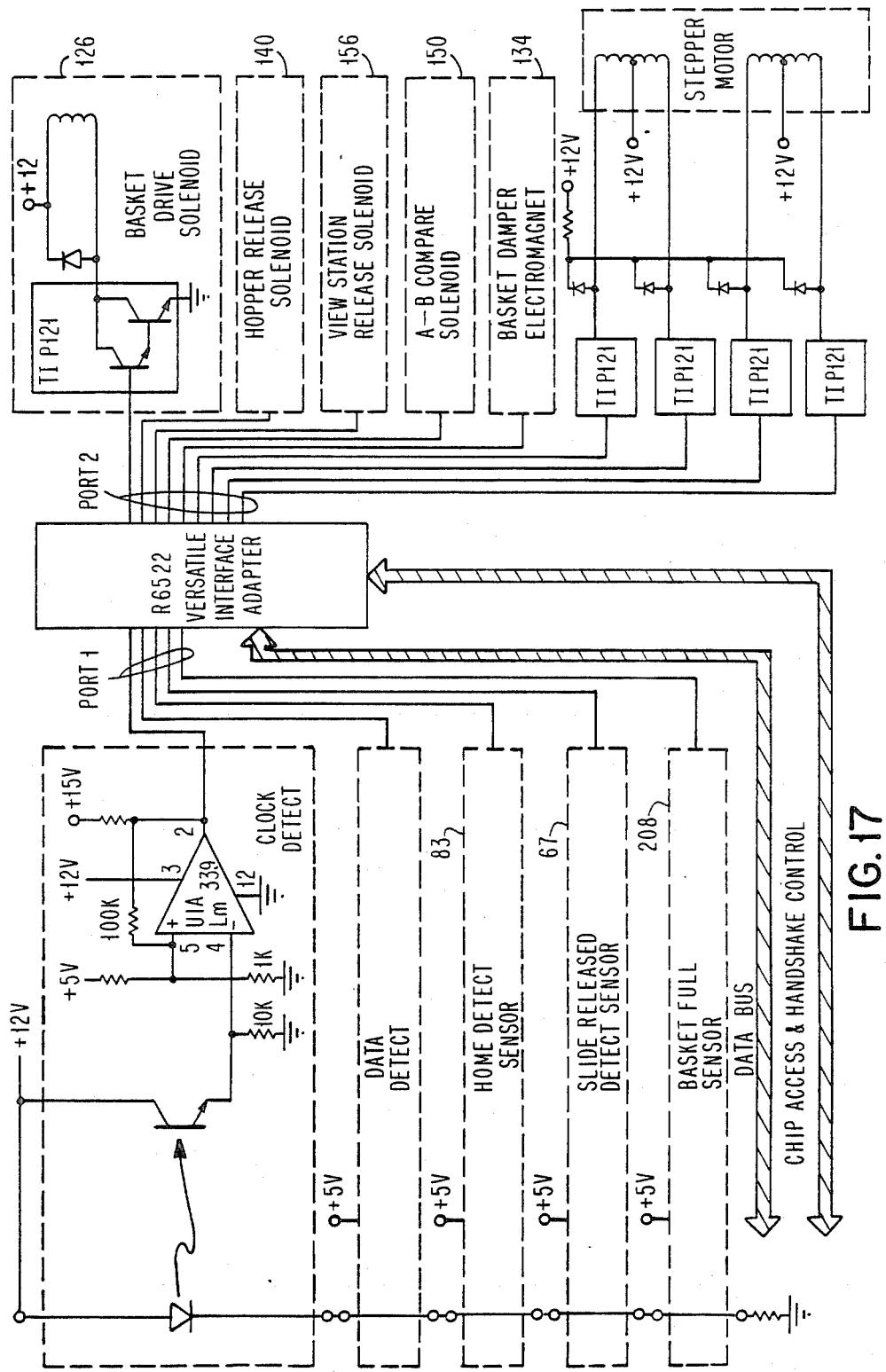
FIG. 17 is a schematic diagram of the electronics for interfacing the apparatus of FIG. 2 with a computer; and, FIGS. 18 through 39 are flow diagrams of the computer programs for interfacing the apparatus of FIG. 2 with a computer and for utilizing therewith.

The electronic circuitry for reading the slide, bin, and Circular tray projector tray codes is shown in FIG. 17, and is described in section 5.1.

3.4 Computer Search System

Using the unique slide accession number, the user programs the computer to index, collate, and categorize information about slides for easy retrieval by subject matter, date, photographer, or any other descriptor used to identify the slide.

When used with the editing console (sorter and projector tray loader mechanism), the computer program can find a selected slide as the slides are being sorted by reading the bin ID number, combining the bin number with the index position of the slide in the bin to create a pointer, and using that pointer to look-up the slide accession number in a table. The computer can arrange the slides automatically into different bins or into different compartments of a circular tray slide tray. Since the bin code and the projector tray code are also inputted to the computer, the computer knows at all times the exact storage location of each slide.

4.0 Slide Editing

4.1 The Slide Editing Console

Figure 2:
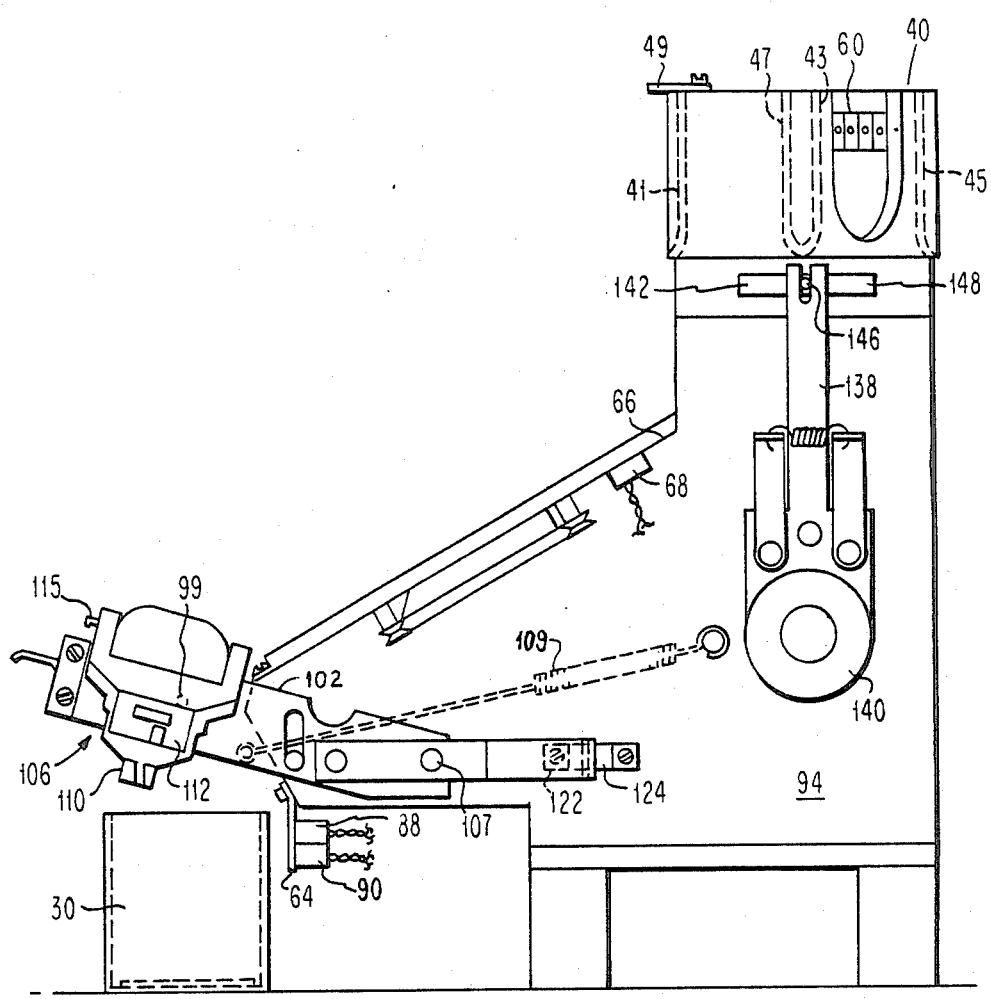
FIG. 2 is a right side view of the slide editing console of FIG. 1, with the covers removed.

The slide editing console (2) is shown in FIG. 1 and in detail in FIG. 2.

The editing console has a housing (94) made of a structural material, such as a metal casting or a relatively stiff-sheet plastic glued together to form a frame. The housing is attached to a base plate which is not shown in FIG. 2. Within the two walls (96, 98, FIG. 8) of the frame, there is an inclined chute (66) set at an angle, for example, 30 degrees, with the horizontal.

At the lower end of the chute there is provided a slide basket (hidden from view in FIG. 2), which is U-shaped and is mounted by means of a pivot pin (99) to rotate. Pivot pin (99) passes through holes in the wall portions (102, 104 shown in FIGS. 2 and 12)of the latch mechanism (106). The latch mechanism is shown in the up position (bin-sort mode) in FIG. 2. The slide basket (108, shown in FIGS. 12 and 13) may be made out of light-weight plastic.

4.2 Dual-mode Latch Mechanism

The latch mechanism (106) shown in FIG. 2 allows the apparatus to be used to sort slides into bins on the sorting wheel/nest or to load slides into a projector circular tray. The dual-mode latch mechanism pivots on latch mechanism pivot pin (107) so that the mechansim can be latched up or down by the toggle action of latch spring (109). Two slide guideways (110, 112) are pivotally mounted by pins (113, 115 shown in FIGS. 14 and 15) and are held together by tension on spring (162), when the latch is in the down position, shown in FIG. 15. As shown in FIG. 13, the guideways are held tight against the edges (114, 116) of the projector tray and serve to guide the slide (80) into the projector tray slot (120).

Figure 14:
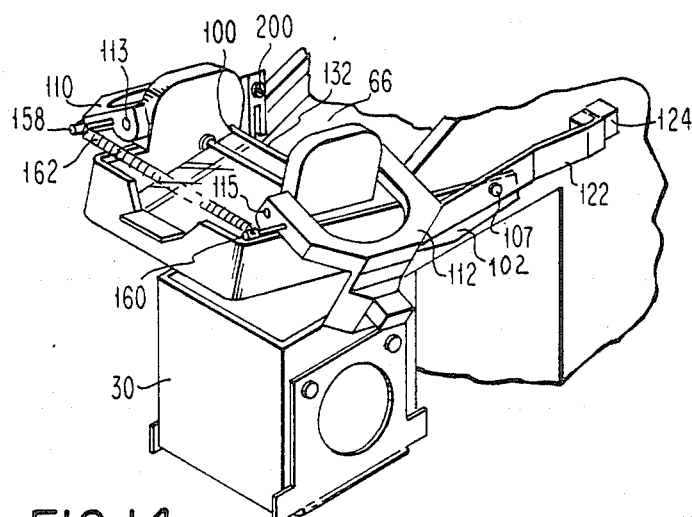
FIG. 14 is perspective view of the mechanism of FIG. 2 with the dual-mode latch mechanism latched in the up (slide-sort mode) position.

When in the up position, the guideways (110, 112) spread out of the way as shown in FIG. 14. Wires (196, 198) attached to each guide way by means of screws (200, 202) pull down on the guide ways by action of the spring and lever arrangement shown in FIG. 12. The levers (204, 206) bottom out so as to not exert any force on the guides when the latch is in the down position. A tab (122) interrupts the light path to a photocell (124) to provide a positive indication that the latch is in the up position.

In order to operate in the slide-sort mode described below, the latch mechanism (106) must be raised to the up position shown in FIG. 2 and a bin nest having bins thereon must be placed on the turntable. Slides are then loaded into the hopper (40) by inserting a bin in the hopper, and closing the catch (49). A slide is dropped onto the chute (66) automatically from slide hopper (40)

by actuating the hopper release solenoid (140). The slide travels down the chute by force of gravity past the ID code reader (68) which reads the slide ID number, and then to the viewing station where it is restrained. The slide may be removed from the viewing station manually and reoriented or removed for editing. Or the slide may be shunted to one side by actuating the A-B comparison mechanism shown in FIGS. 8 and 9 for later comparison with another slide. The turntable is rotated so that the appropriate bin (30) is under the chute and the restraining mechanism is activated to release the slide into the bin.

4.3 Projector tray Loading Mode

Figure 12:
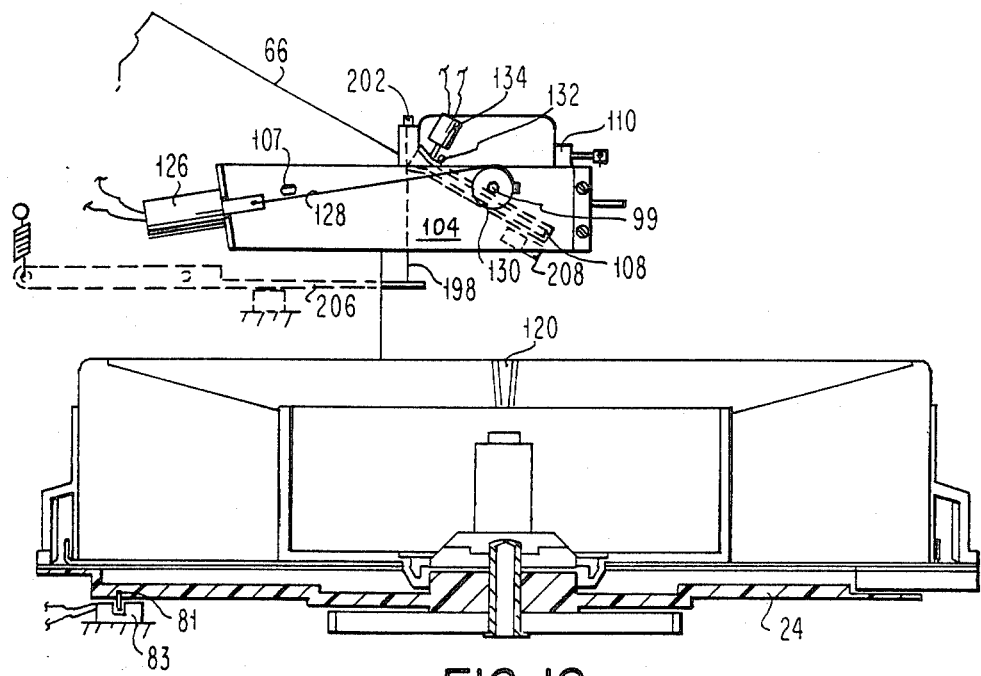
FIG. 12 is a partial left side view of the mechanism of FIG. 2 with the projector tray in place.
Figure 16:
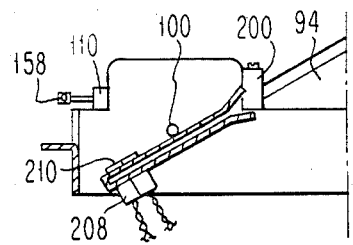
FIG. 16 is cross sectional view of the slide basket and basket full sensor.
Figure 15:
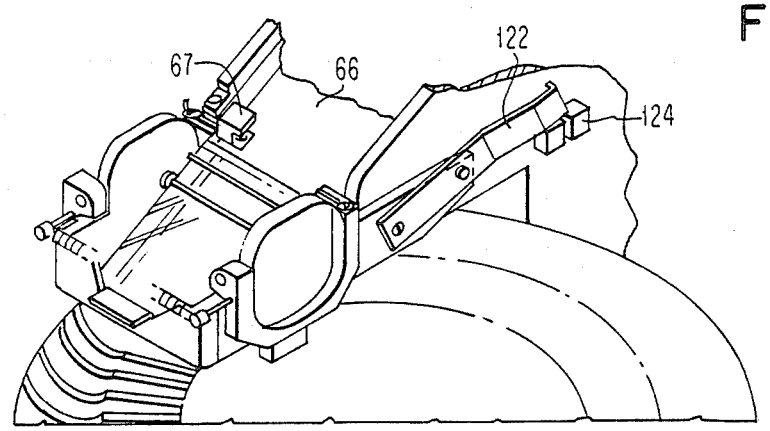
FIG. 15 is perspective view of the mechanism of FIG. 2 with the dual-mode latch mechanism latched in the down (tray-load mode) position.

In order to operate in the projector tray load mode, the latch mechanism (106) must be lowered to the down position shown in FIG. 15 and a projector tray must be placed on the turntable. Slides are then loaded into the hopper (40). A slide is dropped onto the chute (66) automatically from slide hopper (40). The slide travels down the chute by force of gravity past the ID code reader (68) which reads the slide ID number, and then to the viewing station where it is restrained. Upon computer command, the slide is released from the viewing station and is allowed to drop into the basket (108). As shown in FIG. 16, a basket full sensor (208), similar to the device shown in FIG. 6, senses that the slide has seated itself to the end of the basket by interruption of a light beam to a photosensor. The basket walls are transparent. A reflective strip (210) is attached to the outside wall of the basket. When the basket is in the position shown in FIGS. 12 and 16, the light from the light source shines through both transparent walls, reflects off of the strip (210) and onto the photocell. When the slide falls to the end of the basket, the light is interrupted. Refer to FIG. 12. Activating the basket drive solenoid (126) pulls on the wire (128) which causes drum (130) to rotate which moves the basket (108) to the vertical position. The slide drops by force of gravity into the projector tray compartment which has been positioned under the basket.

When the empty basket has returned to its starting position, the light is again reflected onto the photocell (208), indicating both the basket-empty condition and the fact that the basket has returned to its starting position and is ready to accept a new slide.

During circular slide tray loading, the sequential order of slides may be varied by moving the tray to the empty compartment in which it is desired to place the slide.

The next slide in the hopper (40) will drop into the slide basket (108) because the basket will have been released by the computer to return it back to the limit-stop (132). An electromagnet basket damper (134) is energized to attract a metal plate on the slide basket (108) when it returns to the original position in order to eliminate any mechanical bounce. After a brief period of time the electromagnet will be disenergized to allow the basket to rotate once more.

4.4 Slide Hopper Operation:

The slide previewer and tray loader shown in FIG. 2 is equipped with a slide hopper (40) which allows slides to be dropped automatically, one-by-one, onto the chute (66). This dropping mechanism is more fully described in the above-identified U.S. Pat. No. 4,249,329. Briefly, the operation is as follows. Slides are placed in the hopper (40). The hopper (40) is oriented at an angle of 45 degrees to the slide chute (66). The lower portion has an opening cut therein large enough to admit a slide, and in alignment with the chute (66).

A slide carrier having an actuating arm (146) has a similar opening cut therein. The arm (146) engages with a lever (138) which is driven by a rotary solenoid (140). When in the load position with the arm (136) against arm limit-stop (142), the opening in the carrier is in alignment with the hopper (40) so that a slide in the hopper is able to drop by force of gravity into the opening of the carrier. However, the slide is restrained from dropping into the chute (66) by the lower portion of the hopper. This is illustrated more clearly in the above-identified U.S. Pat. No. 4,249,329 in FIGS. 5-7 thereof.

As the slide carrier arm (146) is rotated counterclockwise, the single slide in the carrier is rotated in the same direction. The slide is unloaded and drops onto the chute (66) when the arm (146) reaches limit-stop (148). This is because the opening in the slide carrier becomes aligned with the opening in the lower portion, thus allowing the slide to drop therethrough.

4.5 A-B Comparison of Slides:

The mechanism shown in FIGS. 8 and 9 allows a slide at the viewing section to be shunted to one side and held for later comparison with any subsequent slide. The mechanism operates as follows. An A-B comparison frame, which is a two-slide holder (164), is mounted to the editing console body by means of rollers (168, 170) and spring loaded rollers 172, 174) so that it is free to move back and forth under control of solenoid (150) and lever (152) operating against return spring (154). Each side of the holder has holder guides (176, 178) and (180, 182) and separately actuatable slide restraining detents (184, 186) and (188, 190). When the holder guides for one side are aligned with the slide chute, its detent engages an L-shaped lever (192) which is actuated by energizing solenoid (156) against the pull of return spring (194).

This mechanism allows slides to be compared side by side. It will be readily understood that the apparatus may be modified to hold the two slides one above the other on the inclined chute by providing separate release mechanisms, and/or more than one slide-shunting mechanism can be employed, for example one above the other, so that four slides are held with separate release mechanisms.

4.6 Slide Sort Mode

The slide-sort mode of operation allows one to preview, edit, and sort slides automatically into different storage bins. Six slide bins are fitted into the bin nest (50) which is placed on the rotatable circular turntable (48), shown in FIG. 3. The unique ID number assigned to each bin is read when the bin passes opposite the bin ID bin code reader (64). Alternatively, if a bin code is not used, the computer will sense the position of the table, and hence the bin as being in one of 6 unique positions. As shown in FIG. 12, the turntable (48) has a home limit flag (81) which interrupts light from a photocell in home limit sensor element (83) when the turntable is positioned at the home position. The computer program uses the home position as a reference point from which to count bins in the bin nest.

A bin holding a stack of slides is placed in hopper (40), shown in FIG. 2. Upon activation of rotary solenoid (140), the hopper causes one slide to drop onto chute (66) past code reader (68) which reads the unique slide ID code. The slide is stopped and restrained at a viewing station which back-lights the slide. The slide can be examined by means of a magnifying glass, or the image can be captured by means of an electronic camera and the electronic image transmitted to the computer to be stored along with a slide accession number and any other textural information associated with the slide. At this point the slide can be edited by removing or reorienting the slide, or A-B comparison solenoid (150), FIG. 8, can be activated to move the slide to a position opposite the viewing station for later A-B comparison with another slide. Upon computer command, slide release solenoid (156) is activated, the slide is released, and the slide is dropped into a selected one of the six bins on the slide sorter table. The next slide can now be dropped from the hopper by computer command.

In accordance with dedicated sorting logic or a computer sort program, the slide is dropped into an automatically selected one of the six bins on the slide sorter table. Under control of the dedicated sorting logic or computer program, the sorter table is rotated backward or forward to the appropriate bin position, depending upon the preprogrammed instructions, so that a particular slide, as identified by its accession number, can be dropped into a particular bin as identified by an index position number.

4.7 Projector Tray Load Mode

The projector tray load mode of operation allows one to preview, edit, and load slides automatically into different compartments of a circular projector tray, such as the Kodak Carousel TM projector tray. The projector tray can be placed on the turntable (48) in place of the storage bin nest.

As shown in FIG. 12, the turntable (48) has a home limit flag (81) which interrupts light from a photocell in home limit sensor element (83) when the turntable is positioned at the home position. The computer program uses the home position as a reference point from which to count slide compartments in the projector tray.

With the system under computer control, the slides are automatically dropped, one by one, past the slide ID code reader (68). The computer reads the number, and in accordance with a computer-sort program, the slide is dropped into an automatically selected one of the 80 compartments in the Carousel TM tray. Under control of dedicated sorting logic or a computer program, the tray is rotated backward or forward from the home limit point to the appropriate compartment, depending upon the preprogrammed instructions, so that a particular slide as identified by its accession number can be dropped into a particular tray compartment as identified by an index position number corresponding to the tray compartment number. This allows the flexibility of loading slides in any sequence into a circular slide tray within a matter of minutes. To use this feature, the user may first arrange the slide show in the ordered sequence wanted on the computer display screen, and then instruct the computer to collate the slides in accordance with the sequence selected.

5.0 Computer Control

5.1 Electronic Computer Interface

Refer to FIG. 17 which is a schematic diagram of the interface on the interface card (6) shown in FIG. 1. The interface is a modified Apple II Interface circuit board which can be obtained from John Bell Engineering, Inc. 1014 Center Street, San Carlos, CA 94070. The Bell circuit uses a pair of Rockwell 6522 Versatile Interface Adapters providing four 8 bit I/O ports (port 1,2,3, and 4). In the diagram of FIG. 17, Port 1 is used as an input port and port 2 is used as an output port.

The inputs are:
Clock detect
Data detect
Home detect
Slide-released detect
Basket full sensor
Data bus (two-way)
The outputs are:
Basket drive solenoid
Hopper release solenoid
View-station release solenoid
A-B compare solenoid
Basket damper electromagnet
Stepper motor The operation of the hardware interface will become clear in the description of the computer software in the following section, which references the inputs and outputs listed above.

5.2 Computer Software

5.2.1 Introduction and Terminology

Some of the terms used in the flow diagrams of FIGS. 18–38 are common to many software languages:

GOTO means to go to a new location in the flow diagram and not return.

GOSUB means to go to a subroutine and RETURN at the end of the subroutine, to proceed to the point of departure for the GOSUB command, and then execute the next step.

PRINT is not used to indicate the CRT screen as in many languages, but rather the label DISPLAY is used.

START. When the computer is set up for sorter operations the MAIN MENU (FIG. 18) is displayed and there is one choice SORTEROP (Sorter operations) that leads to mechanical slide sorting. SORTEROP is described in detail in the following sections. All of the other choices on the MAIN MENU are for computer programs that do not require that the peripheral be connected to the computer. These programs are similar to many well known database programs, and no detailed routines are given herein for them.

The MAIN MENU routines are:

ONSCREEN (On screen). This program is for sorting lists of slides on the CRT screen.

FINDSLIDE (Find slide). This program will find which drawers and bins contains designated slides and display this data.

SETUPS (set ups). This program will store in memory the functions of the mechanical slide sorter that are active, such as:

Do Circular trays have numbers?
Do slides have serial number labels?
Is the A-B comparison frame installed and working?
Is a 80-slot circular tray being used?

SLIDEDATA (slide data). This is a name for a program to load a data base of slide descriptions using LABELFORM.

RECALDATA (recall data) is used to recall a set of data, such as a sorted sort of slides, from a disc.

SLIDEFIND (slide find) This routine will sort to find a slide or set of slides in the data base that fits a specified set of search argument requirements, and will display the slides found on the screen for review of other slide descriptors. It will not indicate the physical location of the slides, which is done by the FINDSLIDE program described above.

INPFORM (input form) permits users to make up different formats for inputing data. The form or label is called LABELFORM.

SORTEROP. When this program is selected from the MAIN MENU, then the computer prepares to instruct the editing console to mechanically sort slides. The program goes to HANDLING (slide handling) in FIG. 19 and displays the MASTER SLIDE MENU on the computer screen. The choices that appear on the MASTER SLIDE MENU screen will depend on the position of the dual-mode latch described in Section 4.2. The MASTER SLIDE MENU screen will only present the options that can be performed in the present mode setting of the dual-mode latch. A screen prompt instructs the operator to move the dual-mode latch to the other position for other options, and the menu will change to display those options. Thus, if the dual-mode latch is down (in the tray-load mode), only the options that collate slides into a circular tray are listed. If the dual-mode latch is up (in the sort mode), only the options that sort slides into bins will be listed.

The slide editor will not operate if it is not set up correctly for the operation chosen. More importantly, it will not operate if the set-up conditions would cause damage to a slide or a mechanism. For example, with the dual-mode latch in the down position for circular tray loading, the turntable will not turn if a circular tray is not loaded on it. To operate the turntable with a bin nest wheel installed and the latch in the down position would damage the bins.

A sensor that indicates the position of the dual-mode latch is used in many places in the software to detect the dual-mode latch position. This is done in many subroutines to insure that the operator has not shifted the latch during an operation. Any time that the latch or other conditions are not right for the operation chosen the operation stops and a prompt instruction appears on the computer screen through the DISPLAY routines to tell the operator how to correct the situation.

SLIDETRACK (slide tracking) is a program routine that uses various sensors to follow the physical position of all slides at all times. It is hidden from the operator.

The Master Slide Handling Menu (FIG. 19) will appear whenever the subroutine HANDLING is called. The slide sort program examples under HANDLING are:

HIGHSPEED (high speed sort with no viewing of slides) A list slides that have been sorted by title or descriptors on the CRT screen to a desired sequence are loaded into a circular tray or bins in that desired order.

NEWSLIDE (new slide) A slide can have its title and descriptors added or changed in memory and then sorted by the operator to a chosen slot of the circular tray or bins. This option is used to enter a slide that has not previously been stored in the system.

KEYINPUT (key input) This program is used to organize one or more bins of slides without first sorting on the computer screen. As each slide is seen at the viewing station its slot in the circular tray or the bin on the bin nest is chosen by the operator.

AUTOSORT (automatic sorting) The slides are automatically sorted to the circular tray or to bins as with the HISPEED sort, but the slides stop for the operator to inspect each one at its viewing station.

TABLEADJUST (table adjust) This routine is performed at the factory to calibrate the turntable. It also is needed to recover after a disc crash. The number of motor steps from sensing the home position on the rotary turntable to the zero position on the circular tray is determined. A similar number is determined for the positioning of the number one bin on the bin nest wheel.

SEARCH (search for a physical slide or slides) The drawers and bins where desired slides are located are displayed and then those slides are quickly separated from the total inventory.

COMPARE (compare two slides A-B) Any two slides in the total inventory can be called up and will stop on the comparison frames. After they are compared to the program follows them into other bins or if they are removed, detects this fact and removes their record from the active inventory, and stores the name and descriptors in an "out" listing.

REMOVE (find and remove from stock) This is a routine for quickly finding and removing any slide from storage.

Most of the above routines consist of GOSUB instructions to use a group of software functions that are common to many slide sorting processes. These functions are:

CHECKOUT (check out) checks the sorter mechanical set up.

READBIN, READSLIDE, and READHOPPER (all use the READNUMBER routine to read the hexadecimal codes on the bins, circular tray, and slides.)

HOPPERBIN (hopper bin) Checks the condition of the bin in the hopper.

SLIDEFEED (slide feed) releases one slide from the hopper to the view station.

LOADSLIDE (load slide) loads a slide from the view station to the circular tray.

FILLPOSITION (fill position) Drives the table to position a circular tray slot (tray load mode) or bin (bin load mode) for the next slide.

LOADSELECT (load select) tests position of the dual-mode latch and chooses the appropriate subroutine to load slides into either the bins (LOADBIN) or a circular tray (LOADSLIDE).

SLIDESEARCH (slide search) A routine to prompt the operator about how to search the computer data base for slides, set up a sort sequence, and to find drawers and bins containing the desired slides.

LOADBIN (load bin) loads a slide from the view station to a bin.

READNUMBER (read number) The routine to read a hexadecimal code number on slides, bins or circular trays.

READBIT (read a bit) A subroutine used many times on each reading of a serial number on a slide, bin or circular tray.

BLOCKMOTOR (block motor) Prevents the stepper motor from driving the table when it might do damage to bins.

5.2.1 Computer Operations Menu

Figure 18:
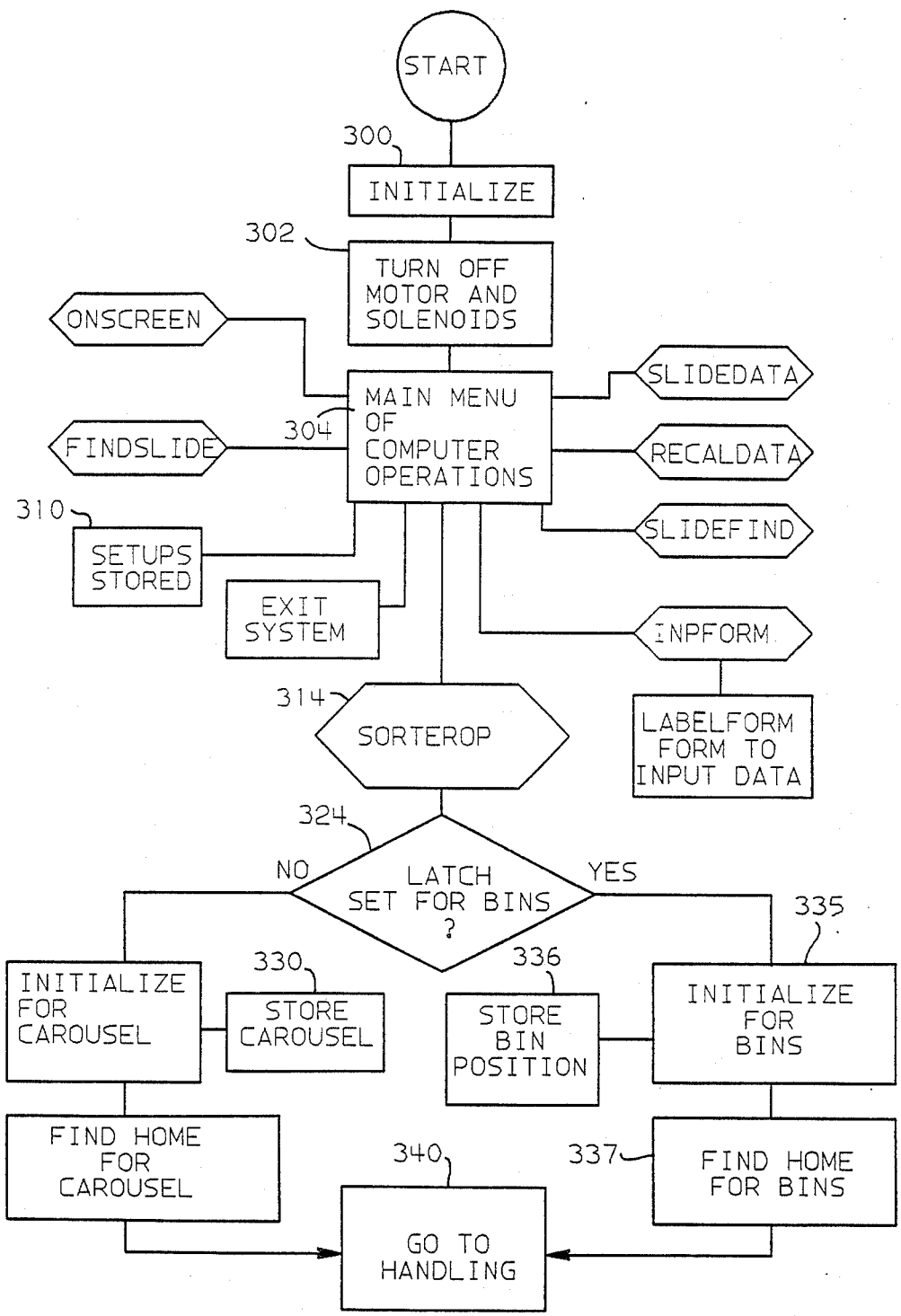

Referring now to FIG. 18, an initialization sequence (300, 302) turns off the motor and other solenoids shown in FIG. 17. On the computer screen, a main menu of computer operations is displayed (304). The options include the following:

ONSCREEN—allows one to change a slide sequence.

FINDSLIDE—allows one to locate a circular tray or bin in which a desired slide is stored.

SETUPS STORED—allows the operator to insert data such as whether the circular trays have ID number labels, whether the slides have ID number labels, whether the A-B comparison option is installed, and the number of circular tray compartments in the tray which is installed (80 or 140 compartment tray).

EXIT SYSTEM—allows the operator to return to the disk operating system.

SORTEROP—allows the operator to invoke a mechanical slide-sorting/collating routine.

SLIDEDATA—allows the operator to store slide data and descriptors into an electronic file opened by the computer.

RECALDATA—allows the operator to load data from a utility disk, which will calibrate the apparatus.

SLIDEFIND—allows the user to find a particular slide from a database disk.

INP FORM—generates an input form for inputting data.

The menu option SORTEROP will be described in detail in the sections which follow to illustrate by example how one can use the invention.

The first step in the SORTEROP (314) routine of FIG. 18 is to test at decision point (324) as to whether or not the dual-mode latch described in Section 4.2 is set at the up position to sort into bins. If YES, then the routine initializes the system for bins (335), stores bin position (336) to indicate for future reference that the latch is up, and finds (337) the home position of the turntable.

If the decision (324) is NO, then the program initializes for circular tray operation, stores the circular tray position (330) to indicate for future reference that the latch is down, and finds the home position of the turntable. In either event, the routine goes to a common HANDLING routine (340). This routine is shown on FIG. 19.

5.2.1 Slide Handling Menu

Figure 19:
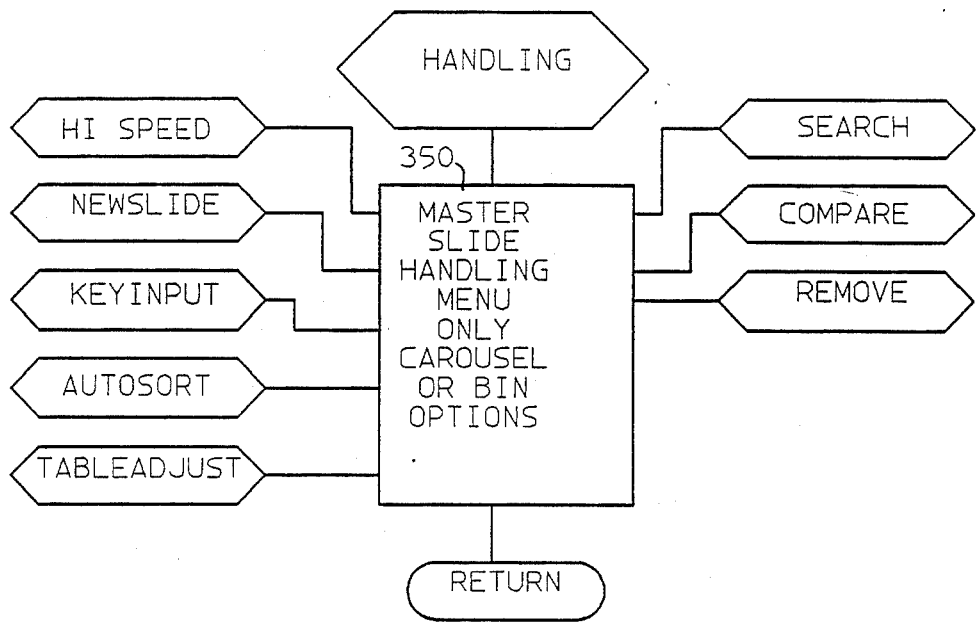

The master slide handling menu (350) shown in FIG. 19 displays appropriate legends, depending upon whether the dual-mode latch is set for bins or circular tray sorting. The following menu options are available in either mode of operation:

HISPEED—allows the user to sort without the slide stopping at the viewing station.

NEWSLIDE—allows the user to search/sort for a particular slide by using a search argument (the title and/or data descriptor of the slide).

KEYINPUT—allows the user to specify from the keyboard the circular tray compartment (slot) or bin in which the slide is to be placed.

AUTOSORT—allows the user to sort with a pause at the viewing station.

TABLEADJUST—is a utility routine to allow the user to adjust the location of the turntable.

SEARCH—allows the user to search/sort for a particular slide by the accession number of the slide.

COMPARE—allows the user to activate the A-B comparison mechanism to compare two slides side-by-side.

REMOVE—allows the user to find and remove a slide from anywhere in the storage system.

5.2.2.1 NEWSLIDE

Figure 20:
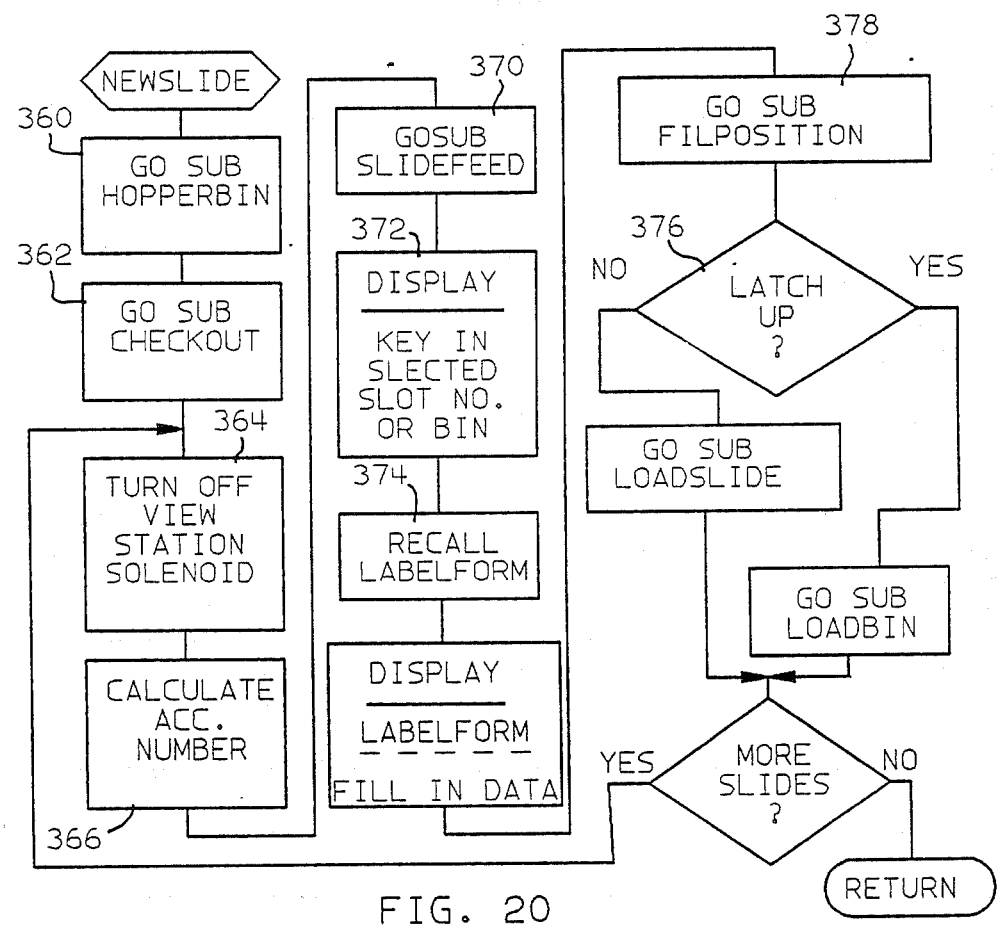

Referring to FIG. 20, the NEWSLIDE menu selection is utilized to enter a slide and data associated with that slide into the storage/retrieval system. The first step (360) is the invocation of the hopper-bin subroutine shown in FIG. 28. This subroutine reads a coded label on a bin which has been placed in the hopper (40) of FIG. 2. First, the bin number is scanned by hopper-bin reader (60), and then the subroutine READ HOPPER of FIG. 33 is invoked. The READ HOPPER subroutine turns on the hopper-bin reader and then goes to the routine READ NUMBER shown in FIG. 30.

Figure 30:
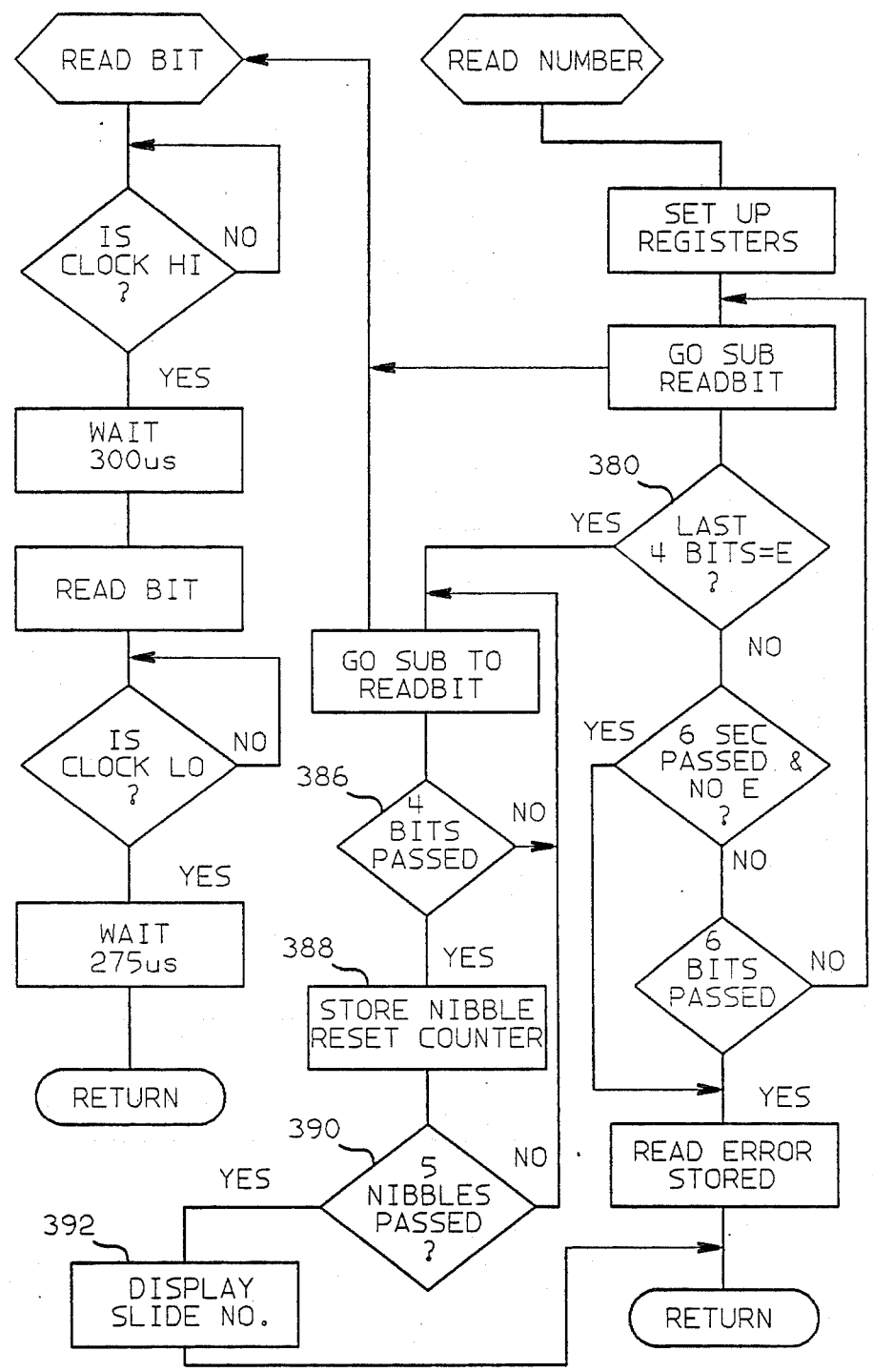
Figure 39:
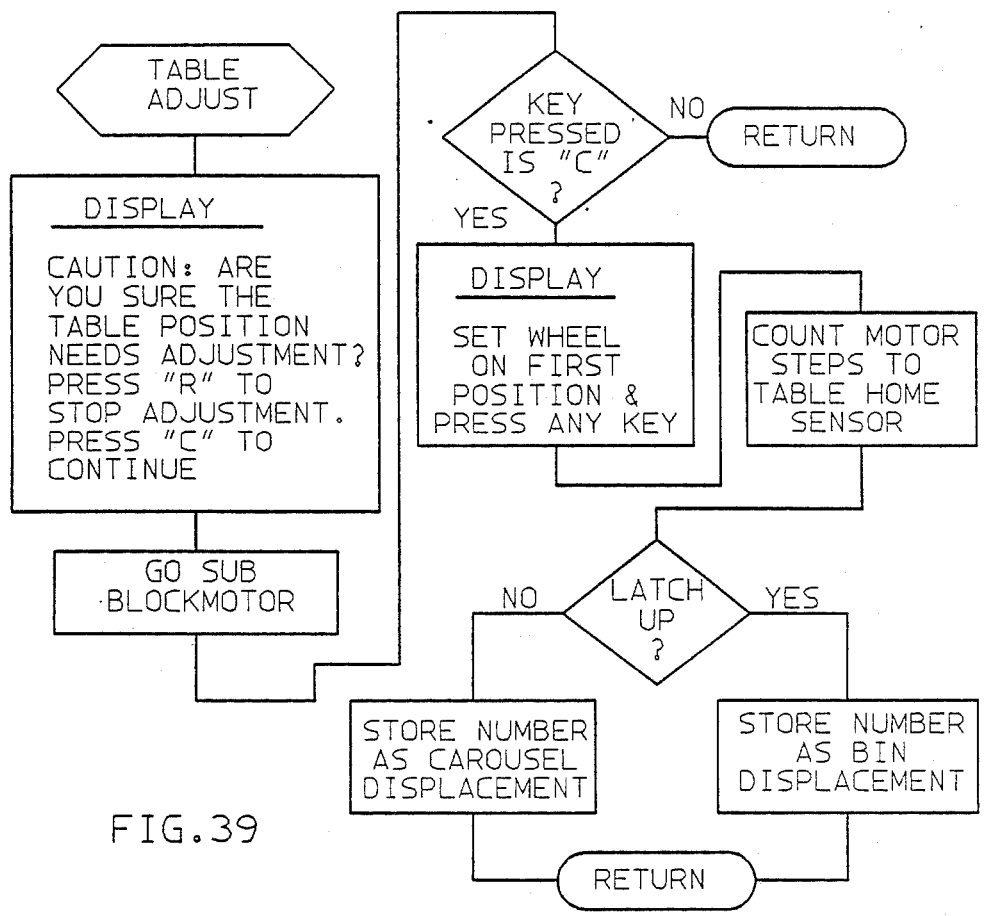
Figures 31, 32, 33:
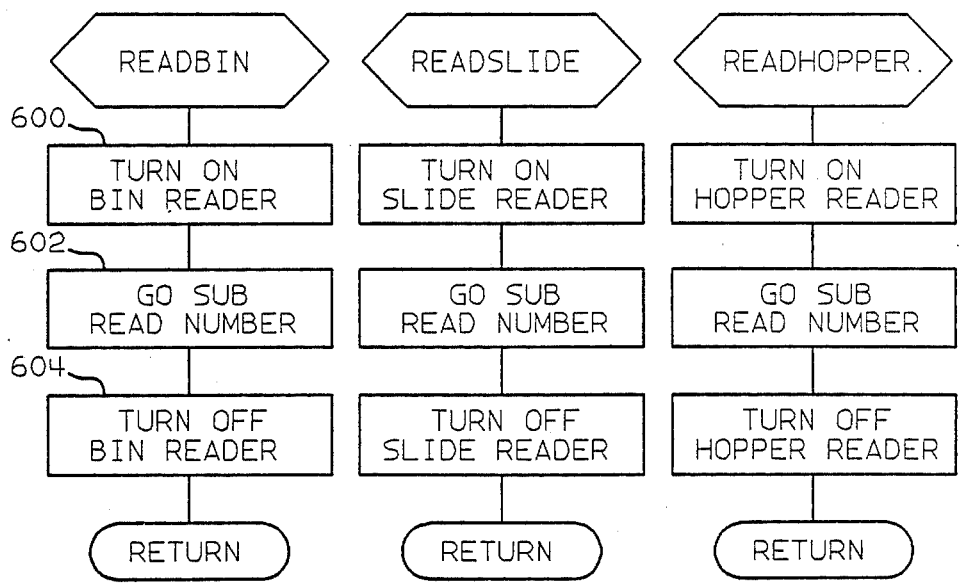
Figure 34:
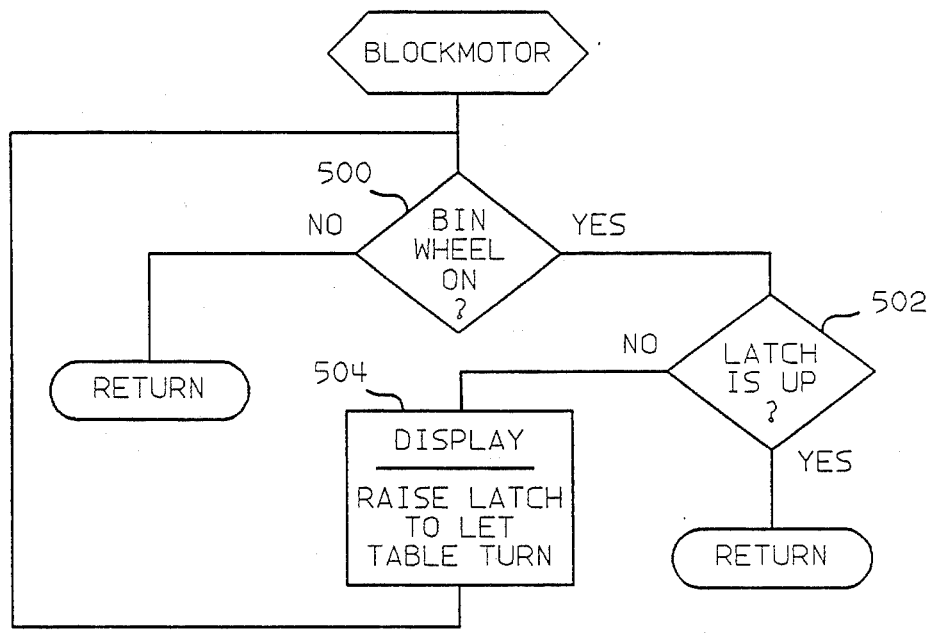
Figure 35:
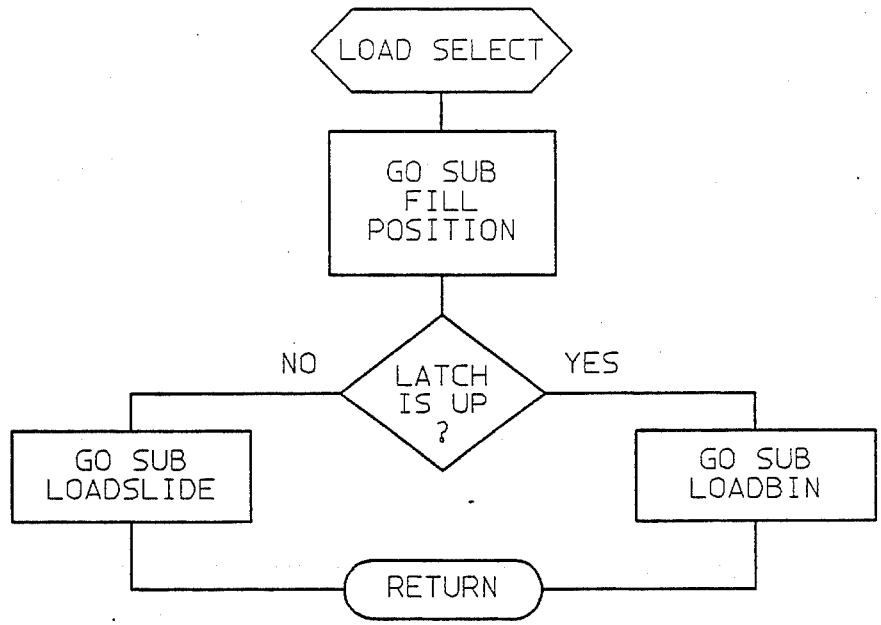

Referring to FIG. 30, the READ NUMBER subroutine sets up shift registers to receive data bits read, sets up a four-bit counter to count bits, and sets up a five-nibble counter to count nibbles. The flow then proceeds to the subroutine READ BIT.

The READ BIT subroutine reads the coded label on the bin in the hopper and then returns. When the last four bits read equals E (block 380), the bin ID number code is framed and the flow again goes to the subroutine READ BIT. When four bits (a nibble) have been read (386), the four-bit nibble is stored and the four-bit counter is reset to zero (388). When five nibbles have been counted (390), the program branches to the DISPLAY SLIDE NUMBER (block 392) and then returns to the flow of FIG. 33. At this point the software turns off the hopper-bin reader and returns to the main flow of FIG. 20.

Figures 27, 27A:
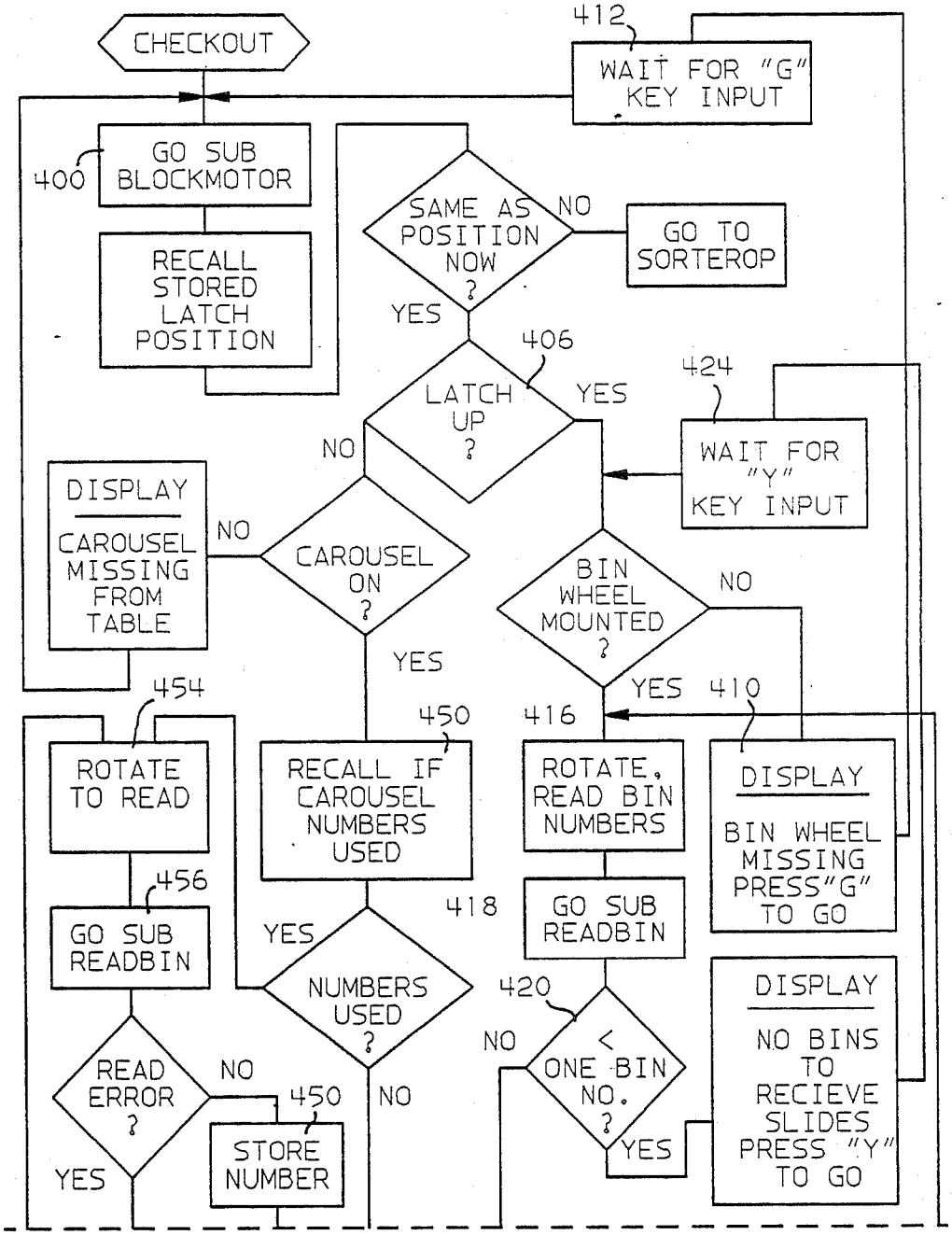
Figure 27B:
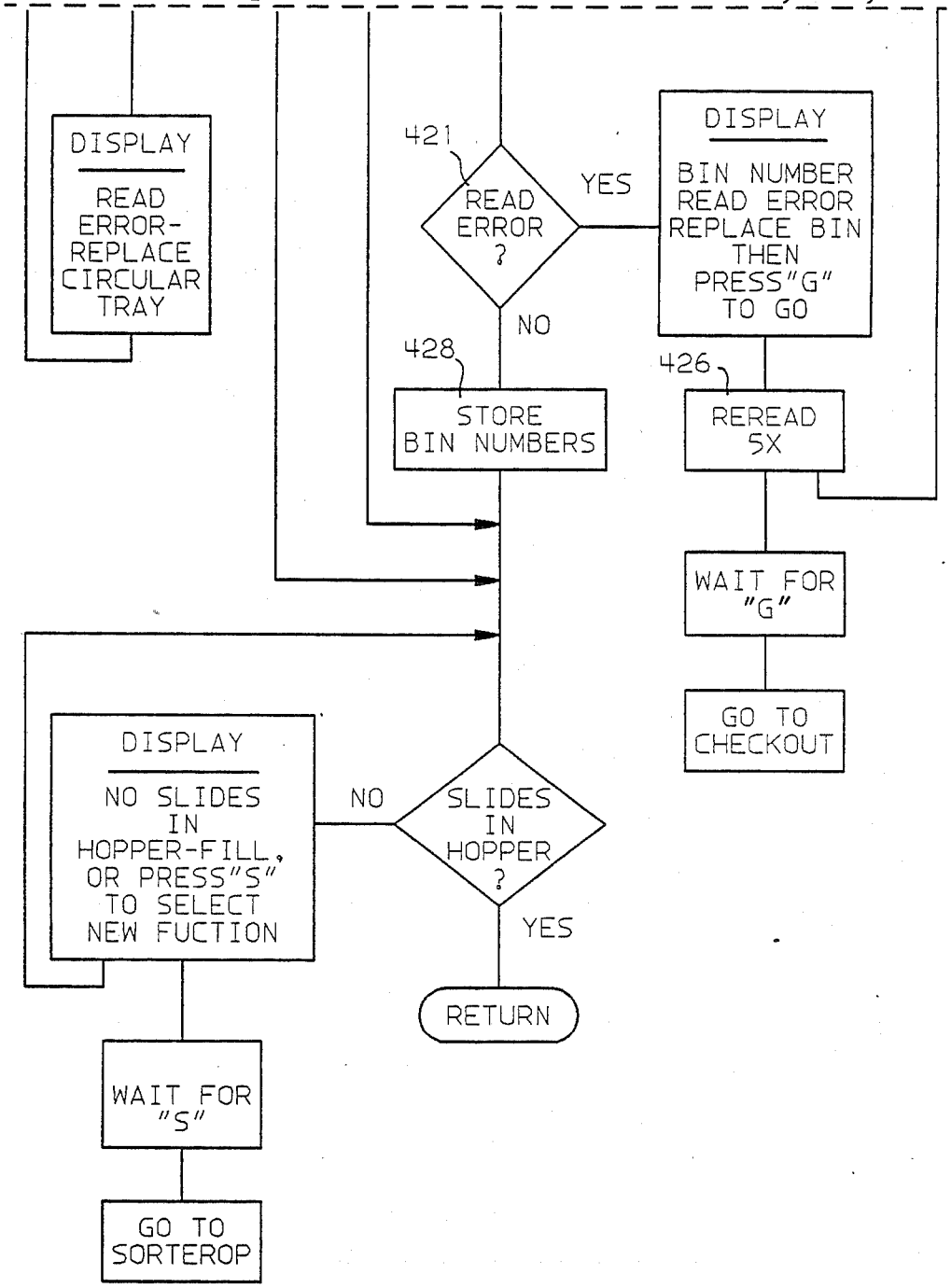

The next block (362) in the flow of FIG. 20 is GO SUB CHECKOUT, which is shown in FIGS. 27A and 27B. The purpose of this subroutine is to check mechanical conditions. The first step (400) is to go to the subroutine BLOCKMOTOR shown in FIG. 34. The BLOCKMOTOR subroutine prevents damage to the bin nest wheel (40) on the turntable (48). The test (500) checks the bin/tray sensor (53) shown in FIG. 10 to see if the bin wheel is on the turntable. If YES, then the software branches to a decision point (502) which determines if the dual-mode latch is in the UP position. If NO, a prompt "RAISE LATCH TO LET TABLE TURN" is displayed (504). When the dual-mode latch is raised, the subroutine returns to the flow of FIGS. 27A and 27B.

Refer to FIGS. 27A and 27B. Recall that the latch position from the SORTEROP subroutine of FIG. 18, was stored in block (336) of FIG. 18. If the stored-latch position is unchanged by the operator, then the flow proceeds to the LATCH UP? decision point (406). If the latch is up, then a check is made of bin/tray sensor (53) to see if the bin wheel is mounted on the turntable. If the bin wheel is not mounted, a prompt (410) is displayed "BIN WHEEL MISSING. PRESS G TO GO." The routine then branches to wait for G key input (412), and the flow is repeated. If the bin wheel is mounted, then the turntable is rotated to read the bin numbers (416). This is accomplished by going through the subroutine READ BIN (418) shown in FIG. 31.

The READ BIN subroutine in FIG. 31 turns on the bin reader (600) and goes to the subroutine READ NUMBER (602) shown in FIG. 30 (described previously with respect to FIG. 33).

When the READ NUMBER subroutine has been completed, the READ BIT subroutine turns off the bin reader (604) and returns to decision block (42) in the program flow of FIG. 27. A decision is made as to whether the number read is less than one bin number. If YES, a prompt is displayed "NO BINS TO RECEIVE SLIDES. PRESS Y TO GO." The program flow then waits (424) for the Y key input and returns to go through the latch-up branch of the program flow. If the decision (420) is NO, a check is made to see if there has been a read error (421). If there is a read error, a prompt is displayed "BIN NUMBER READ ERROR—REPLACE BIN, THEN PRESS G TO GO." The routine loops five times (426), and if five errors, occur, the subroutine goes to the beginning of this subroutine. If no read error occurs, then the bin numbers read are stored (428) and a check is made of hopper-bin reader (60) to see if there are slides in the hopper. If YES, the CHECKOUT subroutine returns to the main flow of FIG. 20. If NO, a prompt is displayed "NO SLIDES IN HOPPER—FILL OR PRESS S TO SELECT A NEW FUNCTION." If the operator presses S, the program will return to the SORTER OP routine of FIG. 18.

A similar flow occurs in FIGS. 27A and 27B if the dual-mode latch is in the down position, set for circular tray operation. If the latch is not up, then a check is made of the bin/tray sensor (53) of FIG. 10 to see if a circular tray is on the turntable. If YES the flow proceeds to block (450). The operator will have inputted set-up data if coded labels for the circular trays are used (see block 310, FIG. 18). If numbers are used, then the flow proceeds to rotate to read (454). This invokes the subroutine READ BIN (456) described previously with respect to FIG. 31.

If a read error occurs, then a prompt is displayed "READ ERROR—REPLACE CIRCULAR TRAY." The program branches back to rotate to read (454) and the subroutine READ BIN is then invoked again. If no read error occurs, the circular tray number is stored (460) and the decision to check if there are slides in the hopper is made. If YES, the subroutine returns to block 362 of FIG. 20.

Figures 8, 9:
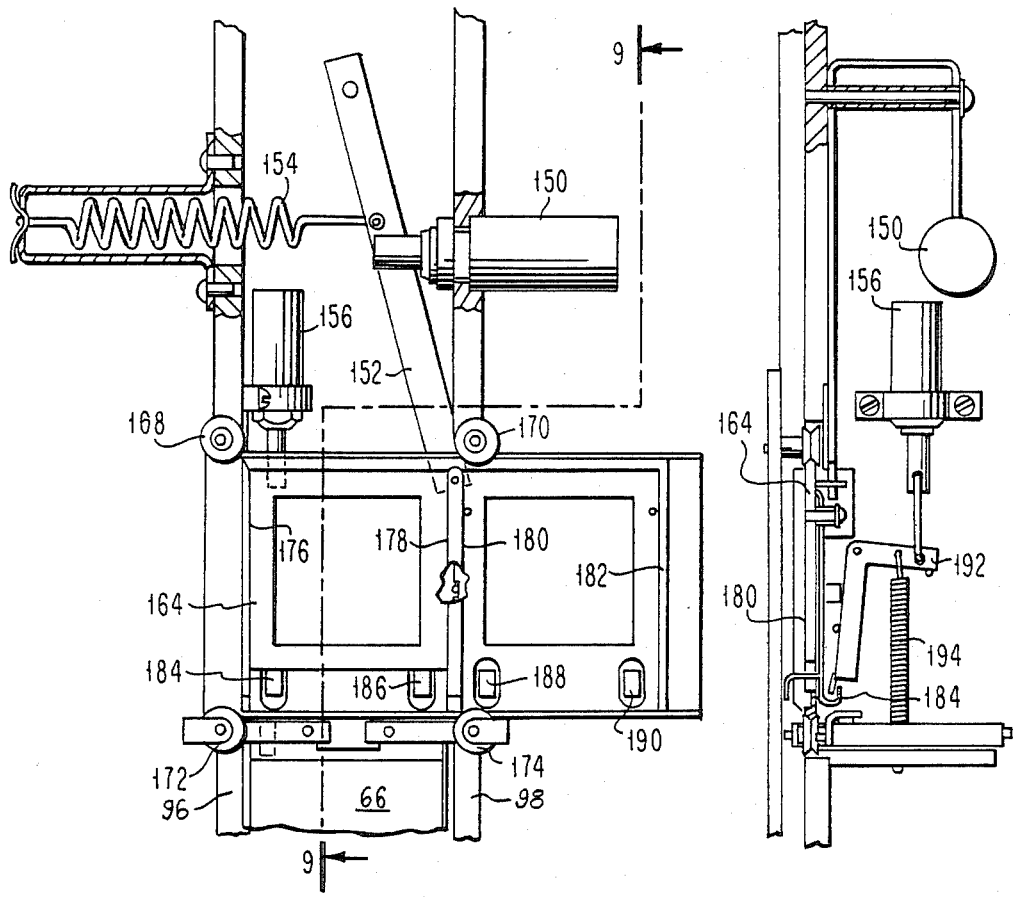
FIG. 8 is a top view of the A-B comparison mechanism of the editing console of FIG. 1.
FIG. 9 is a section taken along line 9—9 of FIG. 8.

The next step (364) of the program of FIG. 20 turns off the view station solenoid (156) shown in FIGS. 8 and 9. This will cause a slide to stop at the view station. Next (366) the slide accession number is calculated by adding an index number to the bin number of the bin placed in the hopper to create a pointer. The pointer is then used to access a table in computer memory that contains the accession number previously assigned by the program to the slide in that bin position. The bin number is recalled from block 510 of FIG. 28. The index number starts at one end is incremented by one each time a slide is dropped from the hopper, up to but not exceeding 40, which is the maximum number of slides that can be stored in a bin. Next (370) the subroutine SLIDE FEED of FIG. 29 is invoked.

Figure 29:
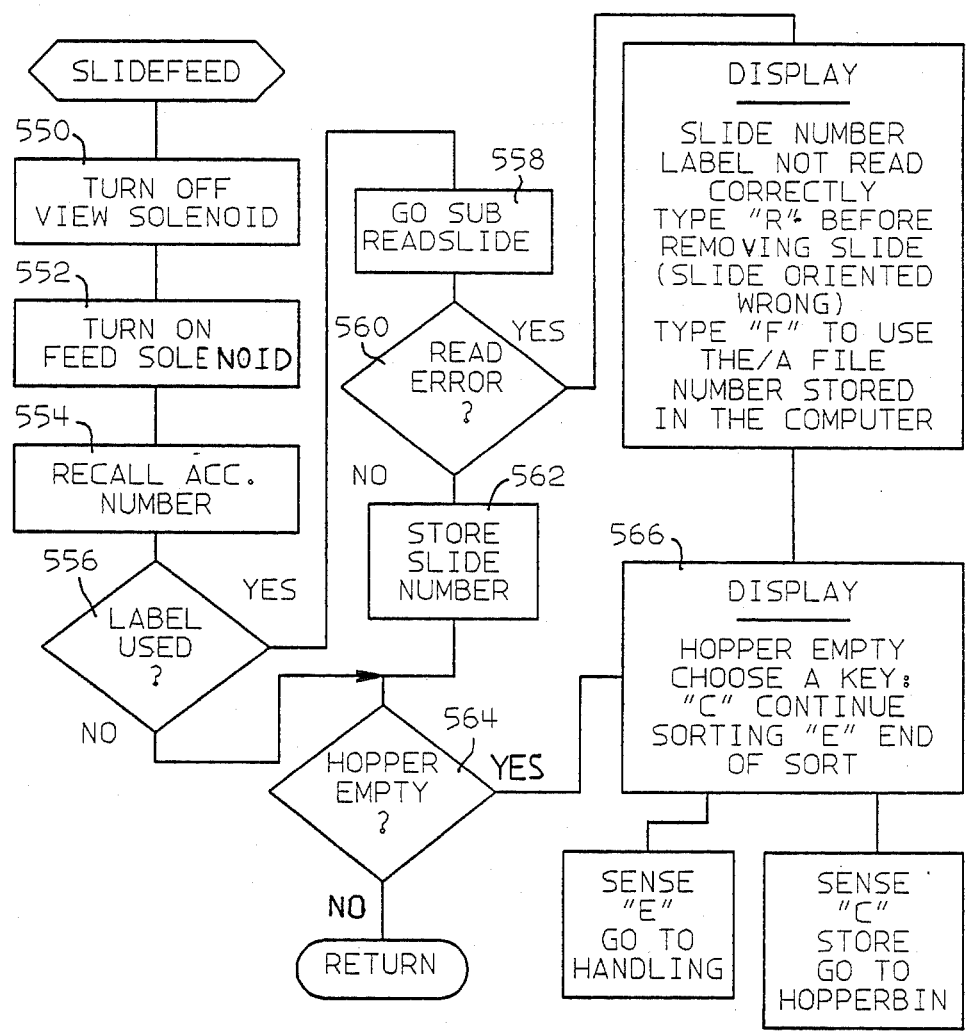

Referring to FIG. 29, the first step (550) is to turn off the view station solenoid and next (552) turn on the hopper-release/slide-feed solenoid (140) of FIG. 2. This causes a slide to drop from the hopper as described in Section 4.4. The slide accession number calculated in block (366) of FIG. 20 is recalled (554). Next (556) the program tests to see if slide ID number labels were indicated during the initial setup. If YES, then the program goes to the READ SLIDE subroutine of FIG. 32. The READ SLIDE subroutine turns on the slide reader and goes to the subroutine READ NUMBER shown in FIG. 30 and described previously.

At the conclusion of the READ NUMBER subroutine, the READ SLIDE subroutine turns off the slide reader and returns to the flow of FIG. 29. If the slide ID number cannot be read or if the accession number (554) assigned to the slide read is not the accession number generated from the bin ID of the bin in the hopper, then a read error is indicated. An appropriate error prompt is displayed to prompt the operator to take corrective action. If there is no read error, the slide number is stored (562). If slide labels were not used, as indicated by a NO output from block (556), then the above steps (558 through 562) are bypassed.

When the hopper is empty (564), a prompt is displayed (566) indicating that the hopper is empty and giving the operator the choice to continue sorting or to end the sort. If the operator chooses to end the sort, the flow goes to the HANDLING subroutine of FIG. 19. If the operator chooses to continue sorting the program branches to the HOPPER BIN subroutine of FIG. 28. If the hopper is not empty, the program flow returns to FIG. 20.

The next step (368) in the flow of FIG. 20 is the display of a prompt "KEY IN SELECTED SLOT NUMBER OR BIN NUMBER." At this point the program uses the accession number (366) to recall the label form (374), which is an electronic worksheet associated with the slide, and displays the label form. The operator is prompted to fill in the data. In this manner, an electronic record is created corresponding to the slide having the accession number calculated in step (366). The next step (378) is to call the subroutine FILL POSITION shown in FIG. 36.

Figure 36:
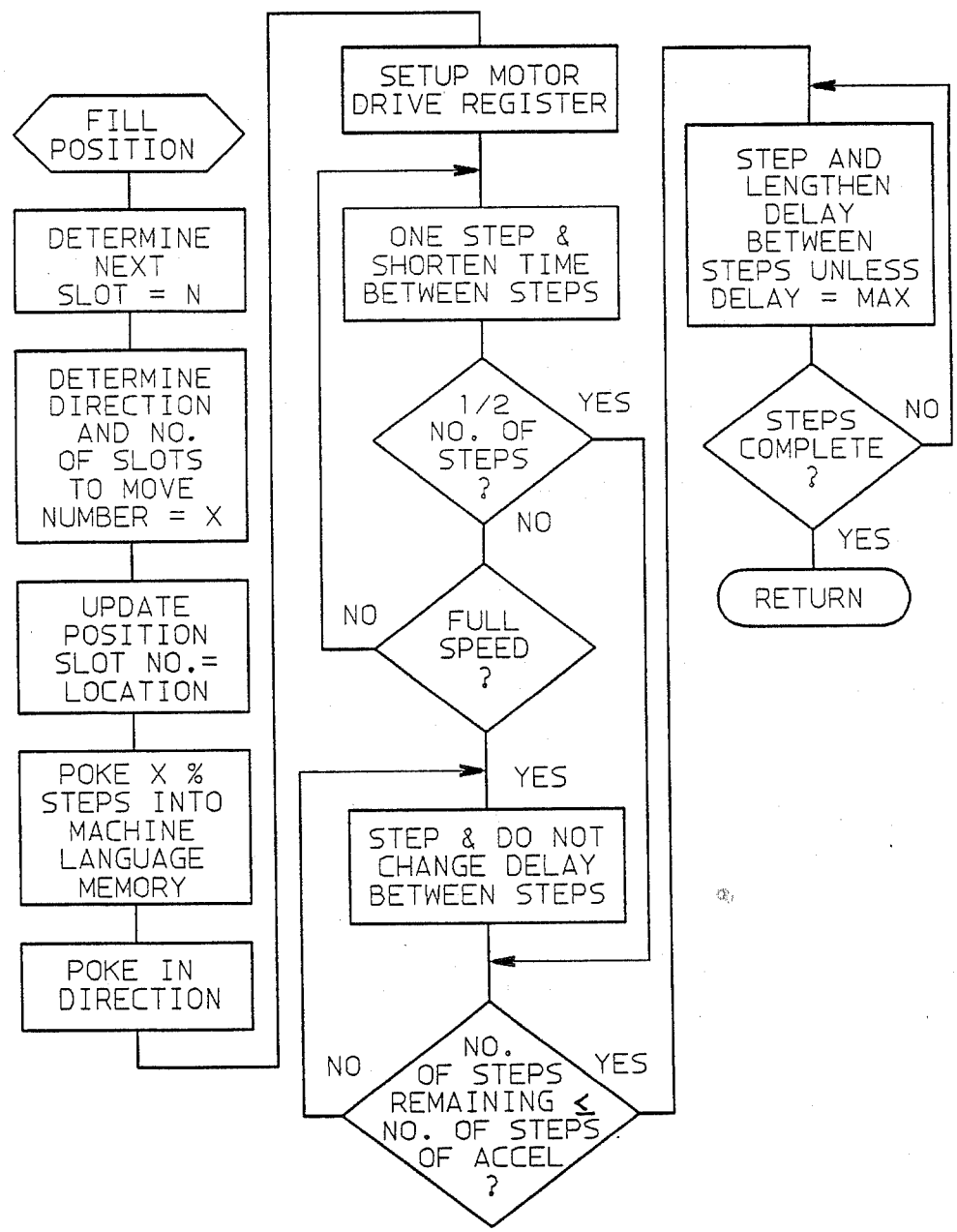

The FILL POSITION, subroutine of FIG. 36, is utilized to fill the circular tray compartments or the bins with slides. The next receptacle slot (tray compartment or bin) number N is determined, and an algorithm is invoked to determine the direction and the number of slots it is necessary to move to reach N. This number is X. The program pokes X, steps into machine-language memory, and pokes in the proper direction. Machine language is now entered and the software sets up the motor drive register of FIG. 17.

The program then takes one step and shortens the time delay between steps and continues this in an acceleration loop until full speed is reached. When full speed is reached, the motor is stepped, but the time between steps remains the same. When the number of steps remaining is equal to or less than the number of steps of acceleration, then the program branches and the motor is stepped and the delay between steps is lengthened unless that delay is already equal to the maximum permissible delay. When the number of steps is complete (that is equal to X), then the program exits from machine language and returns to the flow of FIG. 20.

The next step (376) of FIG. 20 is to check to see if the dual-mode latch is up or down. If up, then the routine branches to the LOADBIN subroutine of FIG. 37. If down, then the program branches to the LOADSLIDE subroutine of FIG. 38.

Figure 37:
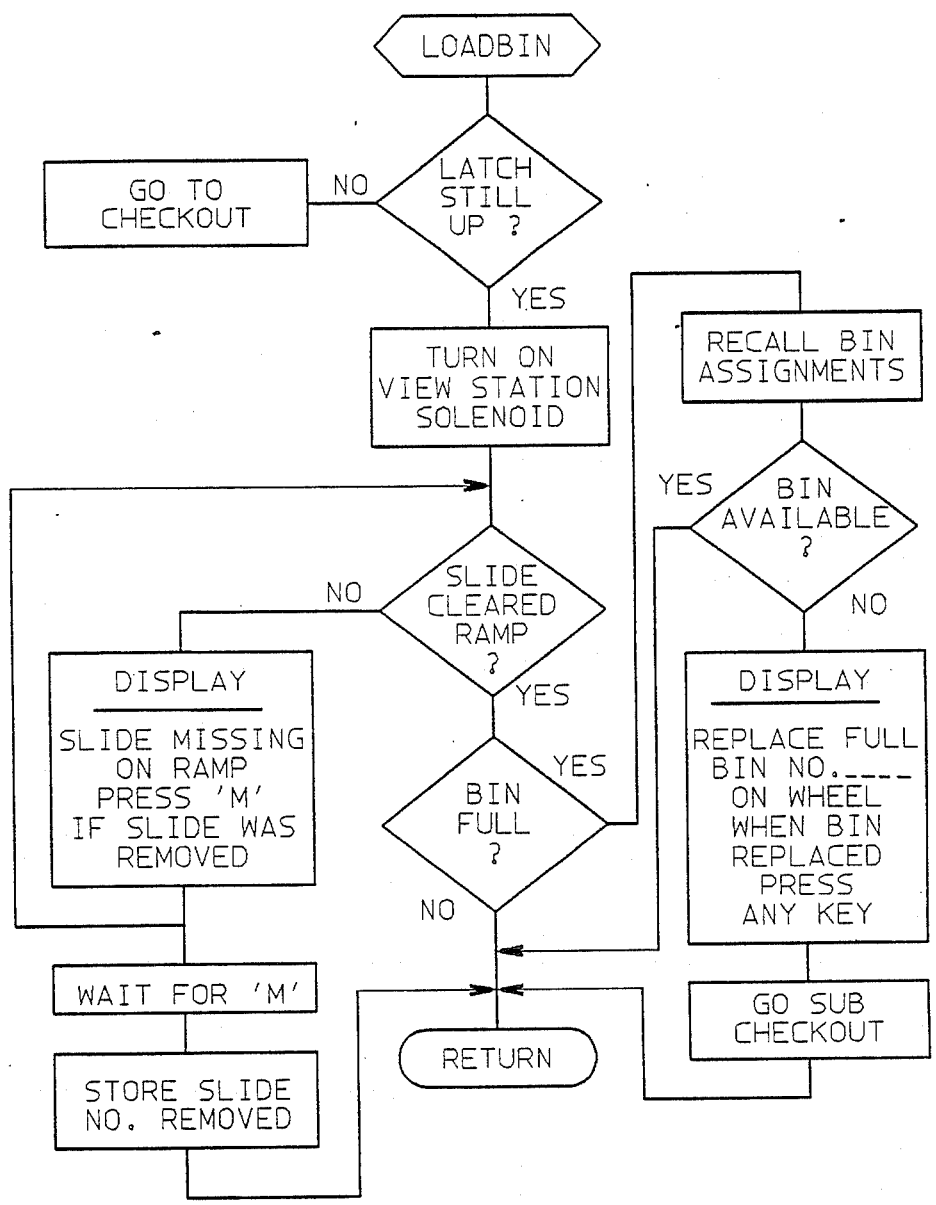

Referring to FIG. 37, the LOADBIN subroutine is utilized to load slides into the bins on the bin wheel. A check is made first to make sure that the dual-mode latch is still up. If YES, then the view station solenoid is turned on which releases the slide from the view station. A check is made with a sensor to see if the slide has cleared the end of the chute. If NO, an error prompt is displayed. If YES, then a check is made to see if the bin under the chute is full. If NO, the program returns to the flow of FIG. 20. If YES, the program recalls the bin assignments and checks to see if there is a bin available. If YES, the program returns to the main flow. If NO, a prompt is displayed to instruct the user to replace the full bin on the bin wheel. When this has been done, the subroutine returns to the main flow. Referring again to FIG. 20, if the latch is in the down position, then circular tray load mode is underway and the program exits to the LOAD SLIDE subroutine of FIG. 38.

Figure 38:
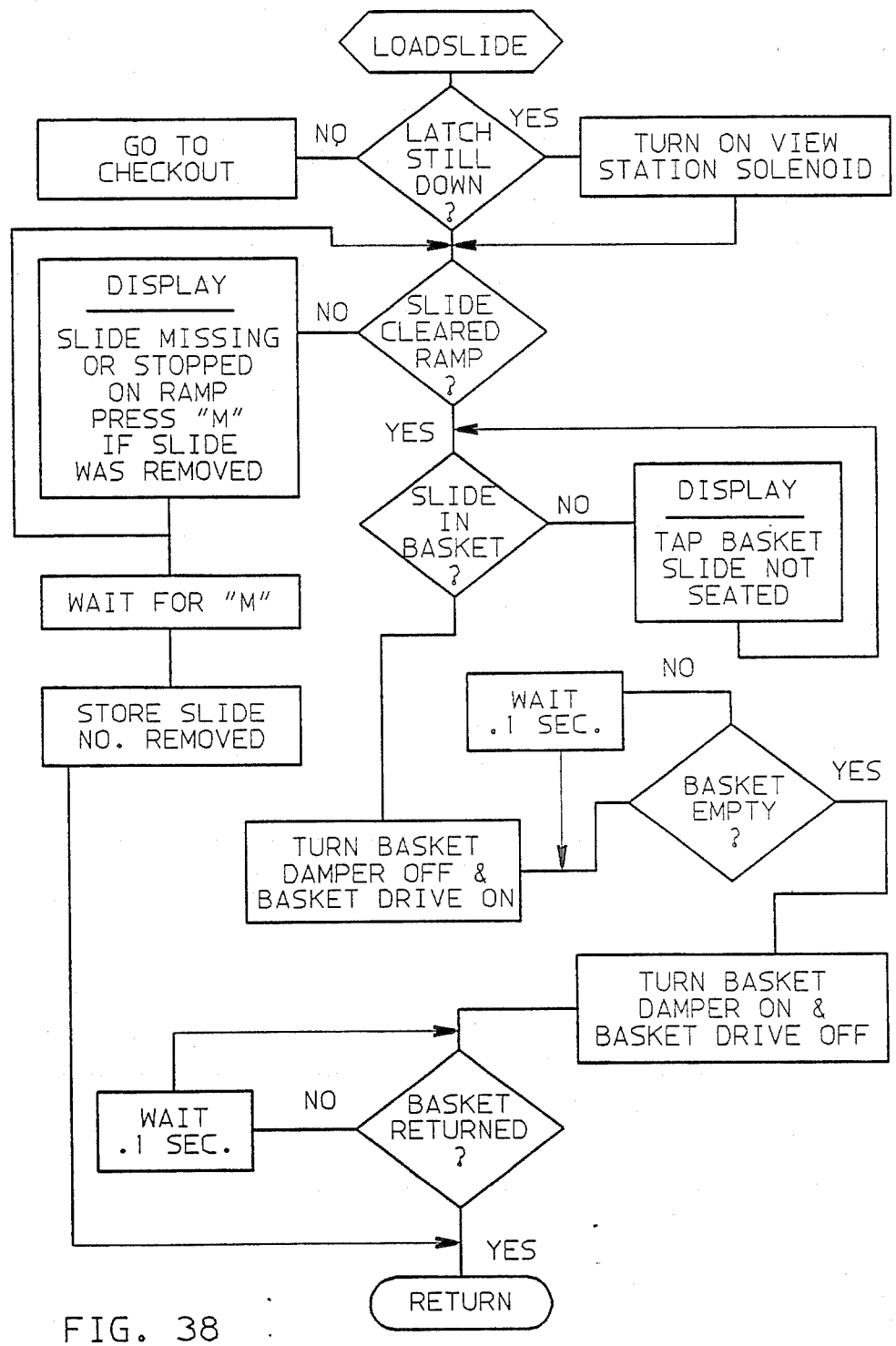

Referring to FIG. 38, the LOADSLIDE subroutine is invoked when the apparatus is in the circular tray load mode. A check is made to make sure that the dual-mode latch is still in the down position. If YES, the view station solenoid is turned on, which releases a slide. If the slide has cleared the ramp, then a check is made of the basket full sensor (208) to see if the slide is in the basket. If slide in basket ? is NO, an appropriate prompt is displayed to instruct the operator to correct the situation. If YES, then the software turns on the basket-drive solenoid (126) shown in FIG. 7 on and the bakset damper electromagnet (134) off. This causes the basket to rotate to the vertical position in which event the slide should drop out of the basket into the circular tray compartment. The sensor (208) is checked again to see if the slide has cleared the basket. If basket empty ? is NO, a one-tenth of a second delay is taken and the test if made again. If YES, then the software turns the basket-drive solenoid (126) off and the basket damper electromagnet (134) on. This allows the basket to return to its original position, ready to receive a new slide. The basket full sensor is checked again to see if the basket has returned to its original position. If basket returned? is NO, a one-tenth of a second delay is taken and the test is made again. If YES, the subroutine returns to FIG. 20, block 378.

5.2.2.2 REMOVE

The REMOVE menu option shown in FIG. 19 is used when the operator desired to find a particular slide and remove the slide from storage. The remove subroutine begins on FIG. 22. The operator inputs from the keyboard a list of slides to be removed. The program flows then goes to the subroutine SLIDESEARCH shown in FIG. 26.

The SLIDESEARCH program displays a prompt "TO FIND ANY SLIDE, GO TO FINDSLIDE. TO SORT A SEQUENCE, GO TO ONSCREEN." Next, the prompt "COPY SERIAL NUMBER OF SLIDES TO BE SORTED" is displayed. The program then enters a routine which locates the drawer number and the bin ID number of the "source" bin containing the desired slides. A prompt is then displayed indicating the drawer and bin number containing the desired slides and the subroutine returns to the flow of FIG. 22. The software now displays a prompt which lists the drawers and the bins with desired slides. Another prompt is displayed "INSERT ONE OF BINS IN HOPPER." Once this is done, the program of FIG. 22 goes to the subroutine HOPPER BIN.

Figure 28:
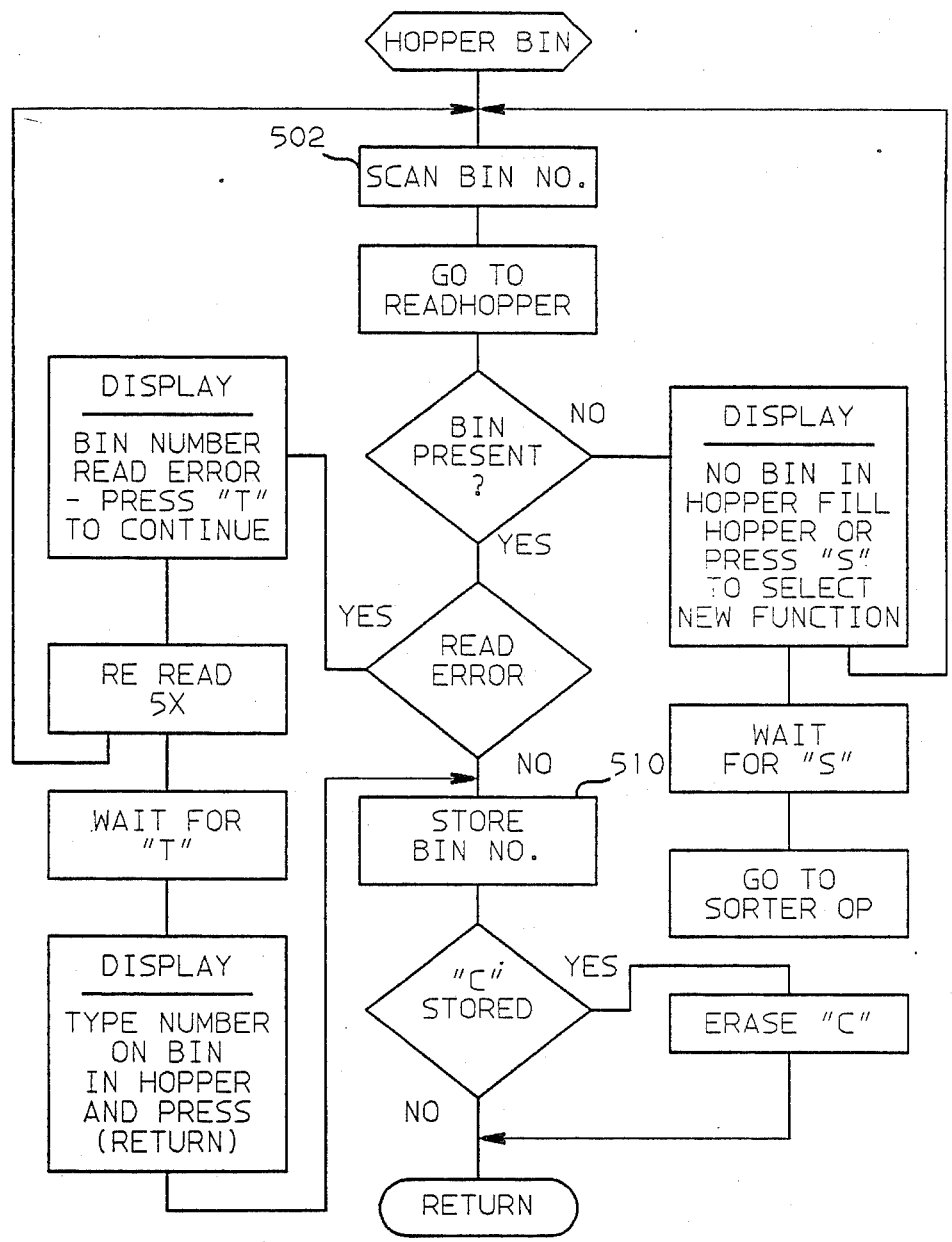

The HOPPER BIN subroutine is shown in FIG. 28 and was described previously with respect to FIG. 20. When the HOPPER BIN subroutine returns to the program flow of FIG. 22, the program goes to the subroutine CHECKOUT shown in FIG. 28. The CHECKOUT subroutine was described previously with respect to FIG. 20. When the CHECKOUT subroutine returns, the program of FIG. 22 enters another subroutine, LOAD SLIDE shown in FIG. 38. The LOAD SLIDE subroutine was described previously with respect to FIG. 20.

If the slide loaded is a slide which was in the list to be removed, the program flow branches to find the "target" bin number (N) in which the listed slide is to be placed. The flow then goes to the subroutine FILLPOSITION shown in FIG. 36, which was described previously with respect to FIG. 20. This subroutine moves the turntable with the bin nest thereon to position the appropriate bin under the slide chute. When the subroutine returns, the subroutine LOADBIN is entered, which is shown in FIG. 37 and was described previously with respect to FIG. 20. This subroutine causes the slide to drop into the target bin which is now under the chute. When the list of slides is complete, the subroutine returns to the main menu. Otherwise, the loop continues until the source bin in the hopper is empty and a new bin is inserted. The subloop is repeated until all source bins have been emptied.

5.2.2.3 COMPARE

Figure 25:
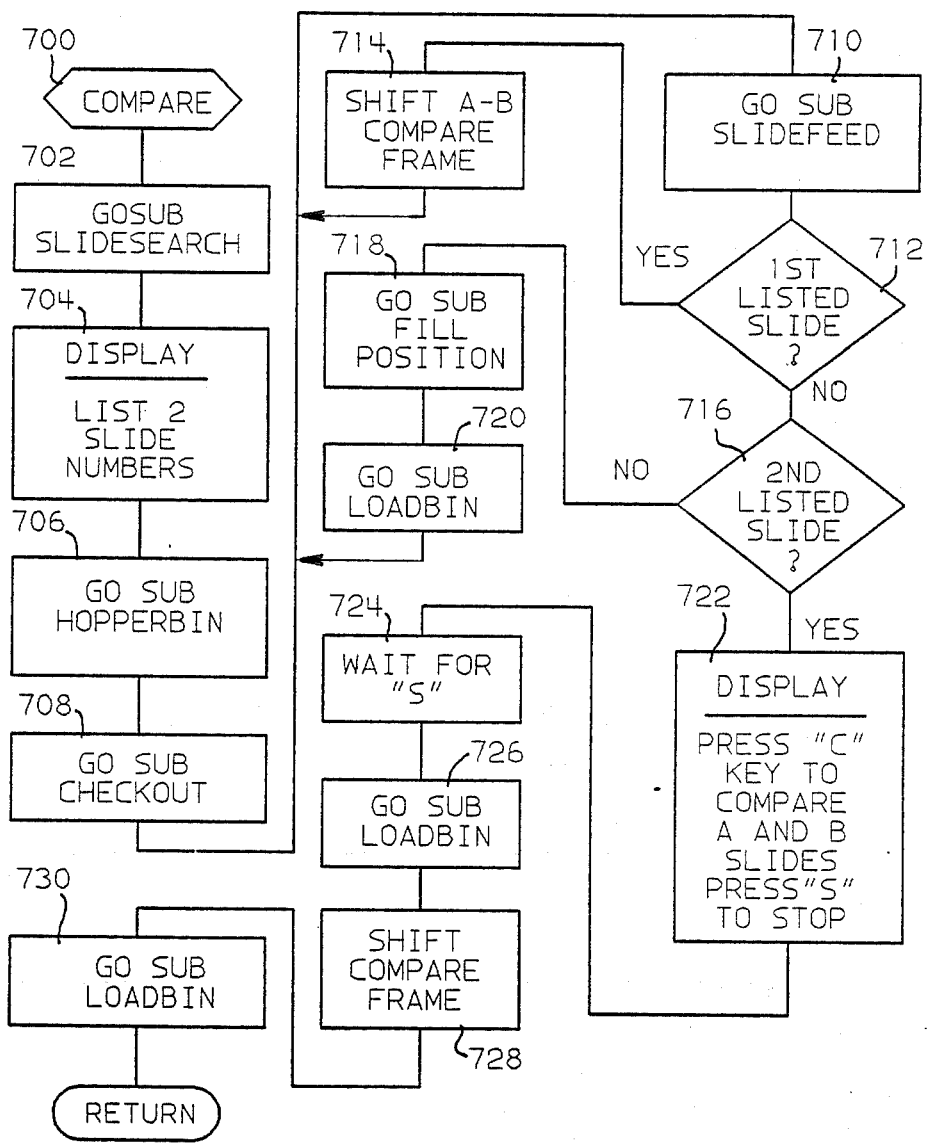

Referring again to FIG. 19, with the dual-mode latch in the up position (slide sort mode) the menu option "COMPARE" is available. This allows the user to compare two slides side by side in the A-B comparison frame described in Section 4.5. The sequence is shown in FIG. 25. The first step (702) is go to the subroutine SLIDESEARCH on FIG. 26, which was described with reference to FIG. 22. SLIDESEARCH is a routine which prompts the operator about how to search the computer data base for slides, set up a sort sequence, and to find drawers and bins containing the desired slides. The operator will answer the prompts with the numbers and/or descriptors of the slides to be compared.

When the subroutine returns to the flow of FIG. 25, a prompt LIST 2 SLIDE NUMBERS is displayed (704) instructing the operator to list the two slide numbers to be compared. When this is completed, the subroutine HOPPERBIN (706) is entered, which is shown in FIG. 28, and was described with reference to FIG. 20, above. HOPPERBIN reads and stores the bin number of a bin placed in the hopper. Upon return from the HOPPERBIN subroutine, the program of FIG. 25 goes to the CHECKOUT subroutine (708) shown in FIGS. 27A and 27B, and was also described with reference to FIG. 20, above. CHECKOUT reads and stores the bin number of each bin placed in the bin nest wheel on the turntable. Upon return from the CHECKOUT subroutine, the program goes to the SLIDEFEED subroutine (710) of FIG. 29, which was described with respect to FIG. 20, above. SLIDEFEED causes one slide to be dropped from the hopper.

If the output of block (712) is YES, this is the first slide listed, and the slide will drop into the A position of the frame. The program causes the A-B compare frame to be shifted to the left B position (714). The SLIDE FEED subroutine is again entered (710). If the output of block (712) is NO, a test (716) is made to see if this is the second slide listed. If the output from block (716) is NO, this it is not the second listed slide, then the program branches to the FILLPOSITION subroutine (718) shown in FIG. 36, which causes the turntable to rotate and move a "target" bin under the chute. Upon return from the FILLPOSITION subroutine, the program enters the LOADBIN subroutine (720) shown in FIG. 37, which causes the slide to be dropped into the bin which is under the chute. This loop continues until a YES output occurs from block (716). Upon this occurrence, a prompt (722) is displayed PRESS "C" KEY TO COMPARE A & B SLIDES-PRESS "S" TO STOP which instructs the user to compare the two slides by pressing the C key, which is a toggle. Repeatedly pressing the C key will cause the A-B comparison frame to move rapidly back and forth allowing the user to compare the two sides as many times as desired. The program waits for the S key to be depressed (724). Upon depression of the S key (724), the program goes to the subroutine LOADBIN (726) shown in FIG. 37. This subroutine was described previously with respect to FIG. 20. This subroutine loads the slide in the comparison frame into the bin on the bin nest wheel on the turntable. Note that during a typical operation, one of the compared slides may be removed from the system.

The computer software handles this situation in the LOADBIN subroutine by displaying the prompt SLIDE MISSING OR STOPPED ON RAMP. PRESS "M" IF SLIDE WAS REMOVED. The slide number is stored after the M key is depressed.

Upon return from this subroutine, the program causes the apparatus to shift the compare frame (728) by energizing the A-B compare solenoid. Next the program goes to the subroutine LOADBIN again (730). This subroutine loads the slide in the other side of the comparison frame into the bin on the bin nest wheel on the turntable. Upon return from this subroutine, the program returns to the main menu, FIG. 19.

5.2.2.4 SEARCH

Figure 26:
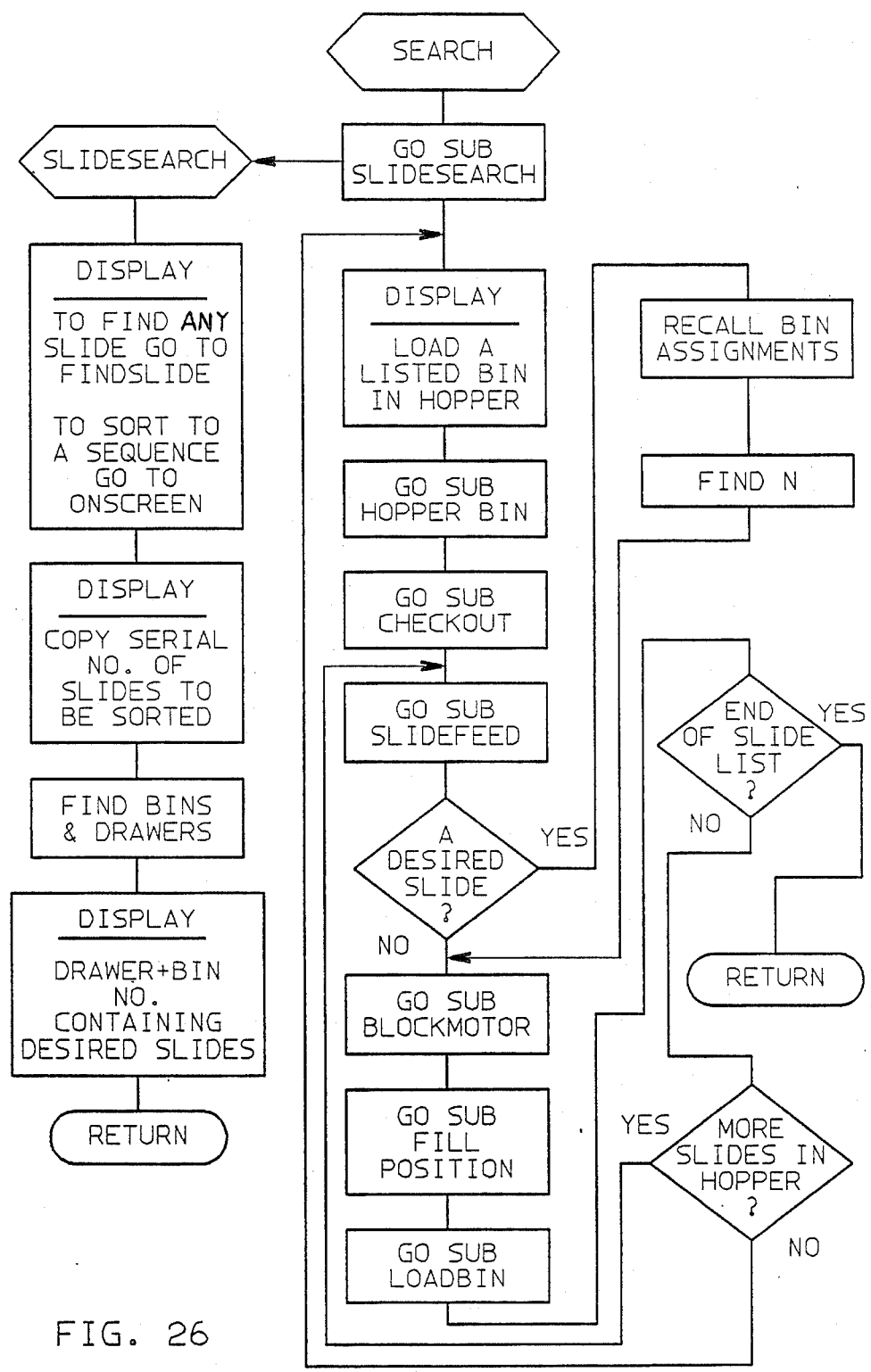

The SEARCH menu option shown in FIG. 19 allows the user to search/sort for a particular slide by the accession number of the slide. The first step in the SEARCH program flow of FIG. 26 is to invoke the SLIDESEARCH subroutine which was described previously under Section 5.2.2.2 with reference to FIG. 22. SLIDESEARCH finds and displays a list of the drawer and bin numbers containing the slides sought. Upon return from the subroutine, the program displays the prompt "LOAD A LISTED BIN IN HOPPER". Once this is done, the program of FIG. 22 branches to the subroutine HOPPERBIN.

The HOPPERBIN subroutine is shown in FIG. 28 and was described previously with respect to FIG. 20. When the HOPPERBIN subroutine returns to the program flow of FIG. 26, the program branches to the subroutine CHECKOUT shown in FIG. 28. The CHECKOUT subroutine was described previously with respect to FIG. 20. Upon return from the CHECKOUT subroutine, the program branches to the SLIDEFEED subroutine of FIG. 29, which was described with respect to FIG. 20, above. SLIDEFEED causes one slide to be dropped from the hopper and generates and stores the slide accession number.

If the accession number of the slide feed from the hopper coincides with one of the listed slides, the flow branches to recall the bin assignments and finds N, the target bin for the slide. The program then proceeds to the subroutine BLOCKMOTOR, described previously under Section 5.2.2.1. The BLOCKMOTOR subroutine prevents damage to the bin wheel on the turntable. The next step is to call the subroutine FILLPOSITION shown in FIG. 36 and described under Section 5.2.2.1 above.

The FILLPOSITION, subroutine of FIG. 36, is utilized to rotate the turnatble so that the target bin is in position under the chute to receive the slide. Upon return from FILLPOSITION, the program calls the LOADBIN subroutine. LOADBIN is utilized to load the slide into the target bin on the bin wheel.

Upon return from LOADBIN, the program checks to see if this is the end of the list of slides. If YES the program returns to the menu on FIG. 19. If NO, the program checks to see if there are more slides in the hopper. If YES the flow branches to SLIDEFEED described above. If NO the flow branches to display the prompt LOAD A LISTED BIN IN HOPPER, described above.

5.2.2.5 HISPEED

Figure 21:
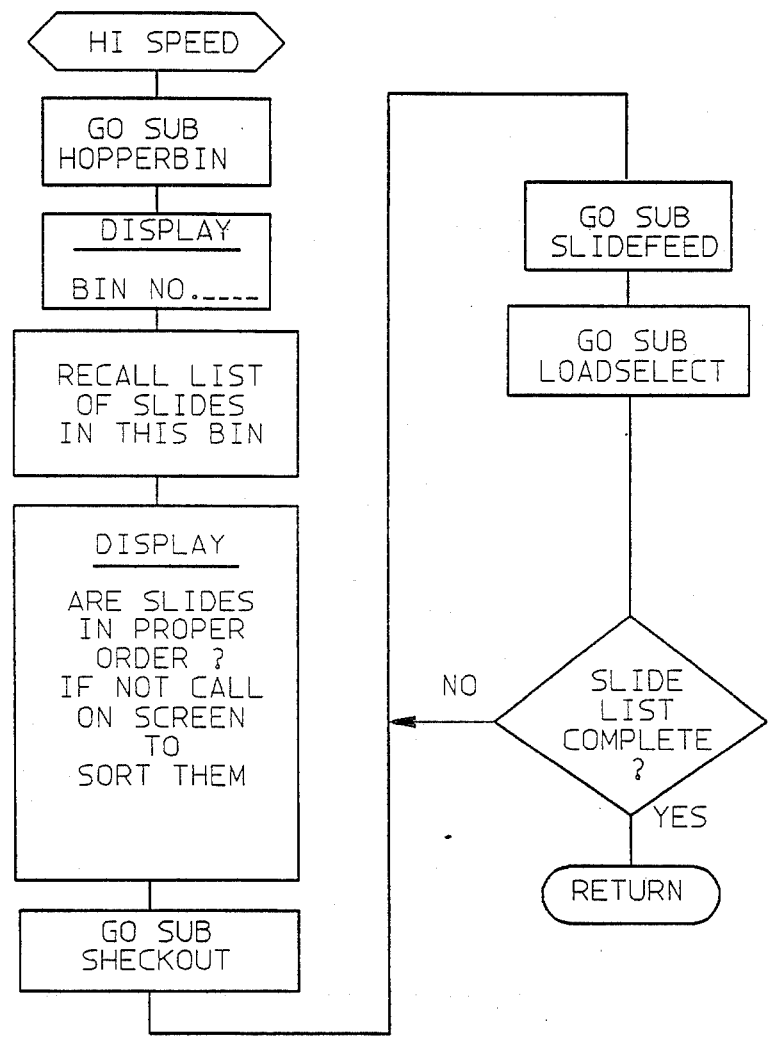
Figure 22:
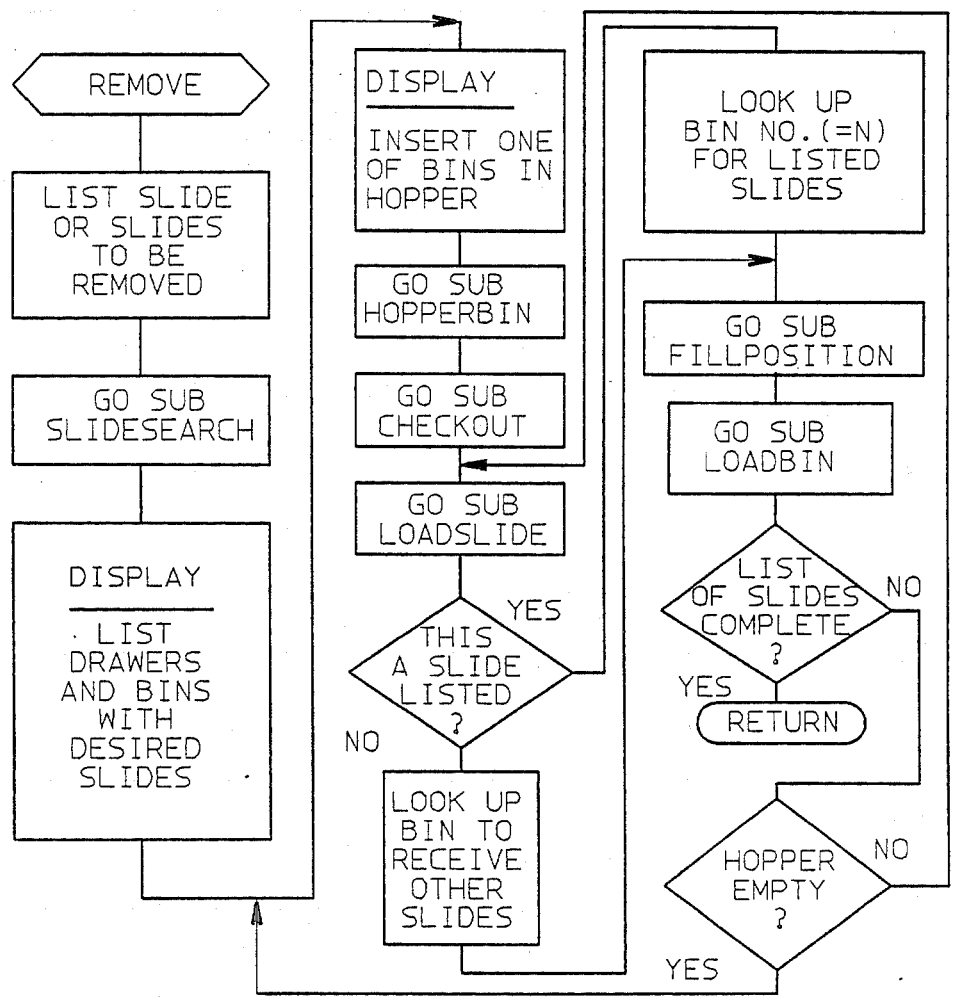

This menu option, shown in FIG. 21, allows the user to perform a high speed sort wherein slides do not stop at the viewing station. A list of slides that have been sorted by title or descriptors on the CRT screen to a desired sequence are loaded into a circular tray or bins in that desired order. The first step is to invoke the HOPPER BIN subroutine. The HOPPER BIN subroutine is shown in FIG. 28 and was described previously with respect to FIG. 20. When the HOPPER BIN subroutine returns to the program flow of FIG. 21, the bin number and a list of slides in the bin are displayed. A prompt instructs the user to sort the slides if they are not in the desired sequence. The program then goes to the subroutine CHECKOUT shown in FIG. 28. The CHECKOUT subroutine was described previously with respect to FIG. 20. When the CHECKOUT subroutine returns, the program of FIG. 21 enters another subroutine, SLIDEFEED shown in FIG. 29. The SLIDEFEED subroutine was described above in section 5.2.2.1. When the SLIDEFEED subroutine returns, the program of FIG. 21 enters another subroutine, LOADSELECT (load select). LOADSELECT, shown in FIG. 35, calls the subroutine FILLPOSITION on FIG. 36 and tests the position of the dual-mode latch and chooses the appropriate subroutine to load slides into either the bins (LOADBIN) or a circular tray (LOADSLIDE). The subroutine then returns to the flow of FIG. 21. The loop continues until the slide list is complete, when the program returns to the main menu.

5.2.2.6 KEYINPUT

Figure 23:
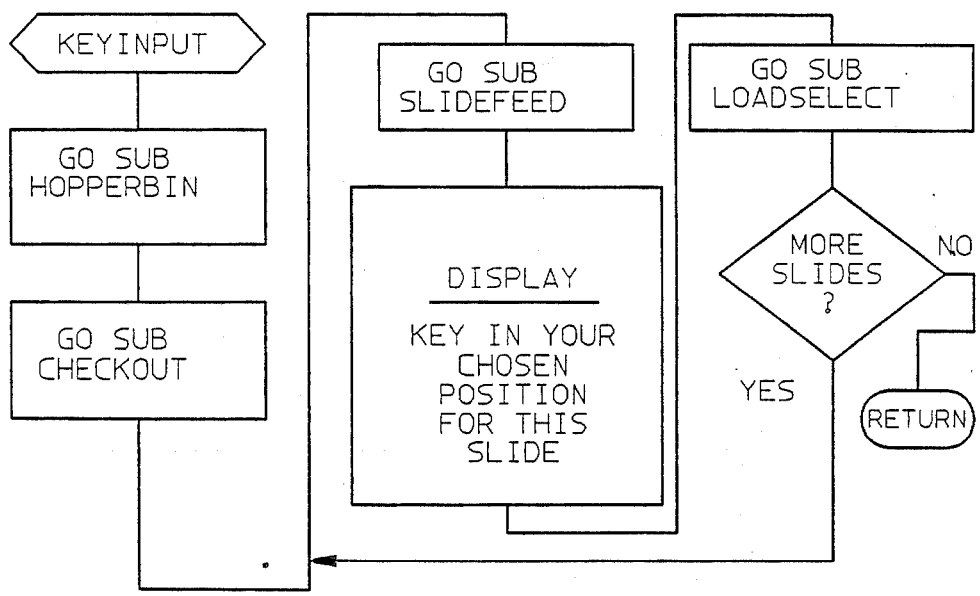

This menu option, shown in FIG. 23 is used to allow the user to load slides into a circular tray or bins by keying in the desired bin or tray slot position for each slide. As each slide is seen at the viewing station its slot in the circular tray or the bin on the bin nest is chosen by the operator. The first step is to invoke the HOPPER BIN subroutine. The HOPPER BIN subroutine is shown in FIG. 28 and was described previously with respect to FIG. 20. When the HOPPER BIN subroutine returns to the program flow of FIG. 23, the program then goes to the subroutine CHECKOUT shown in FIG. 28. The CHECKOUT subroutine was described previously with respect to FIG. 20. When the CHECKOUT subroutine returns, the program of FIG. 23 enters another subroutine, SLIDEFEED shown in FIG. 29. The SLIDEFEED subroutine was described above in section 5.2.2.1. When the SLIDEFEED subroutine returns, the program of FIG. 23 displays the prompt KEY IN CHOSEN SLIDE FOR THIS POSITION and then enters another subroutine, LOADSELECT. LOADSELECT, shown in FIG. 35, calls the subroutine FILLPOSITION on FIG. 36 and tests the position of the dual-mode latch and chooses the appropriate subroutine to load slides into either the bins (LOADBIN) or a circular tray (LOADSLIDE). The subroutine then returns to the flow of FIG. 23. The loop continues until the slide list is complete, when the program returns to the main menu.

5.2.2.7 AUTOSORT

Figure 24:
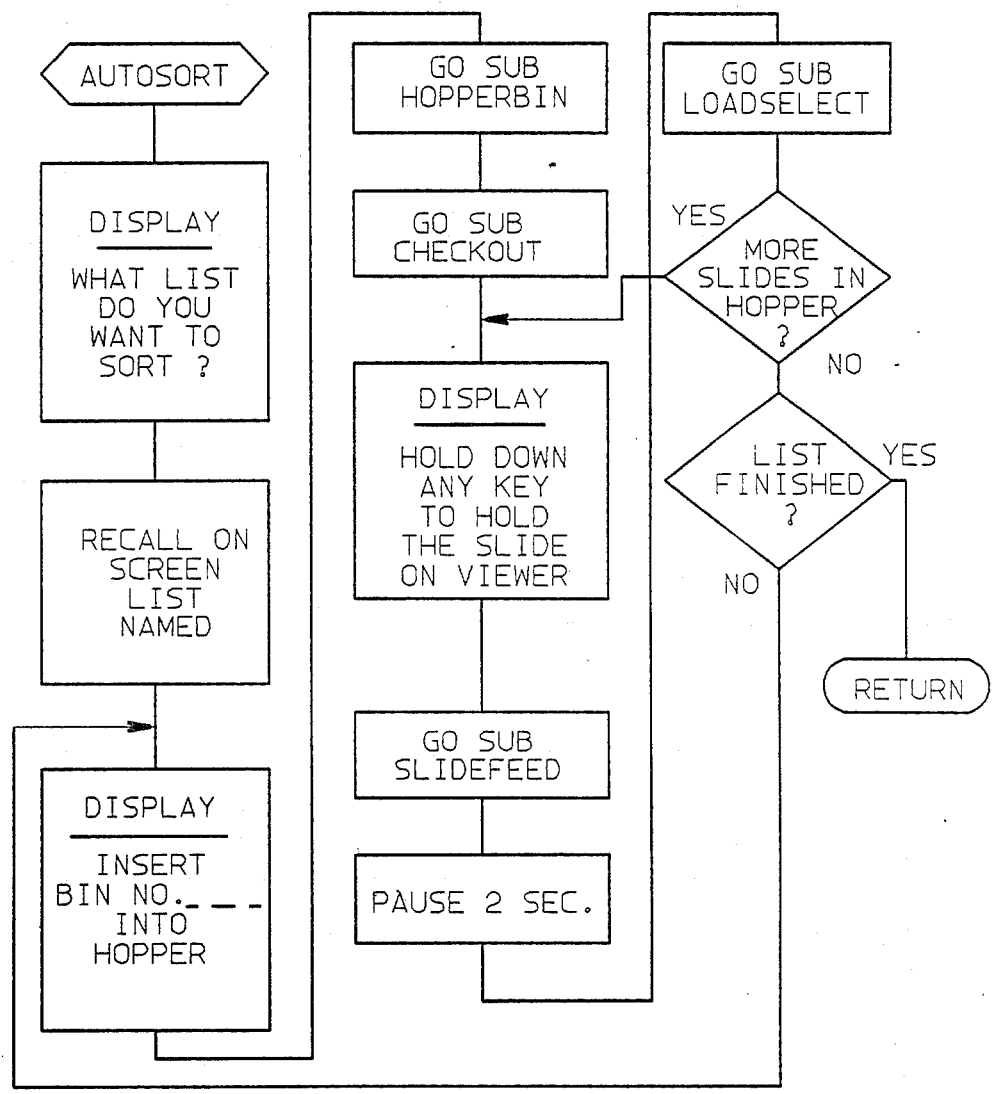

This menu option, shown in FIG. 24, causes the slides to be automatically sorted to the circular tray or to bins as with the HISPEED sort, but the slides stop for the operator to inspect each one at the viewing station. The first step is to display the prompt WHAT LIST DO YOU WANT TO SORT?. The user enters a list name, the computer recalls the list and prompts the user to insert a named bin into the hopper. The program invokes the HOPPER BIN subroutine. The HOPPER BIN subroutine is shown in FIG. 28 and was described previously with respect to FIG. 20. When the HOPPER BIN subroutine returns to the program flow of FIG. 21, the program goes to the subroutine CHECKOUT shown in FIG. 28. The CHECKOUT subroutine was described previously with respect to FIG. 20. When the CHECKOUT subroutine returns, the program of FIG. 21 prompts the user HOLD DOWN ANY KEY TO HOLD SLIDE ON VIEWER. When the key is released, the program enters another subroutine, SLIDEFEED. shown in FIG. 29. The SLIDEFEED subroutine was described above in section 5.2.2.1. When the SLIDEFEED subroutine returns, after a 2 second pause the program of FIG. 23 enters the subroutine, LOADSELECT. LOADSELECT, shown in FIG. 35, calls the subroutine FILLPOSITION on FIG. 36, tests the position of the dual-mode latch and chooses the appropriate subroutine to load slides into either the bins (LOADBIN) or a circular tray (LOADSLIDE). The subroutine then returns to the flow of FIG. 23. The loop continues until the slide list is complete, when the program returns to the main menu.

5.2.2.8 TABLEADJUST

The TABLEADJUST menu option shown in FIG. 19 allows the user to calibrate the turntable. After a cautionary prompt, the first step is to go to the subroutine BLOCKMOTOR shown in FIG. 34. The BLOCKMOTOR subroutine prevents damage to the bin nest wheel (40) on the turntable (48). Upon return from BLOCKMOTOR, the user is given the opportunity to return to the main menu. If the user chosses to continue, the prompt SET WHEEL ON FIRST POSITION & PRESS ANY KEY is displayed. Next, the number (k) of motor steps from sensing the home position on the rotary turntable to the number one slot/bin position is determined. A test is made to see if the dual-mode latch is up. If YES the number (k) is stored as a bin displacement. If NO the number (k) is stored as a circular tray displacement.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A slide sorter comprising:
a movable turntable having a plurality of slide receptacles thereon;
first means for holding a group of slides above said turntable, said first means including releasing means for releasing slides from said group one by one and delivering means for delivering one slide released from said group of slides to a position above said turntable;
second means including means for associating each slide in said group of slides with a previously derived accession number uniquely identifying each said slide, said second means further including means for deriving an updated accession number for said one slide that is delivered by said delivering means;
third means responsive to said second means for utilizing said updated accession number in accordance with a sorting algorithm to move said turntable to locate a particular slide receptacle relative to said position above said turntable; and
fourth means for activating said releasing means so that said one slide is delivered by said delivery means to said position above said turntable, and thence into said receptacle.

2. The combination in accordance with claim 1 wherein said means for deriving an updated accession number for said slide includes means for reading a slide identification code affixed to said slide and means for causing a read error indication upon the condition that said slide identification code is incorrectly read.

3. The combination in accordance with claim 1 wherein:
said first means for holding a group of slides above said turntable includes means for receiving a bin, said bin having a bin label affixed thereto, and,
said means for associating an accession number for a slide includes
means for reading said bin label affixed to said bin, and,
means for associating a slide in said group of slides which utilizes said bin label to recall the accession number which uniquely identifies a slide based upon the relative position of said slide in said group of slides in said bin.

4. The combination in accordance with claim 1 wherein said means for deriving an updated accession number comprises:
a slide identification code detector;
said slide identification code detector being located with reference to said first means such that a slide delivered by said delivering means passes by said slide identification code detector;
said slide identification code detector including means for generating an identification number uniquely identifying said slide and means for transmitting said identification number to said means for deriving an accession number for each slide.

5. The combination in accordance with claim 1 wherein said turntable having a plurality of slide receptacles thereon is a circular slide tray wherein said slide receptacles are the individual vertical compartments of said slide tray.

6. The combination in accordance with claim 5 further comprising:
means for selectively retaining or not retaining said one slide at said position above said turntable.

7. The combination in accordance with claim 6 wherein said means for selectively retaining or not retaining said one slide at said position above said turntable includes frame means for positioning two slides next to each other so that said slides can be compared.

8. The combination in accordance with claim 7 wherein said frame means comprises:
comparison means including first holding means for holding a first slide and second holding means for holding a second slide, said first and second holding means being located with respect to each other such that at least two slides can be held side-by-side,
said comparison means being located such that said comparison means is free to move back-and-forth, and,
means for selectively
(A) moving said comparison means to a first comparison position wherein said first holding means is positioned to capture a first slide in said first holding means and
(B) moving said comparison means to a second comparison position wherein said second holding means is positioned to capture a second slide in said second holding means.

9. The combination in accordance with claim 6 wherein said means for selectively retaining or not retaining said one slide at said position above said turntable includes
 a chute for providing a passage through which slides may pass from one end of said chute to another end of said chute,
 comparison means including first holding means for holding a first slide and second holding means for holding a second slide, said first and second holding means being located with respect to each other such that at least two slides can be held side-by-side,
 said comparison means being located between said one end of said chute and said other end of said chute such that said comparison means is free to move back-and-forth, and,
 means for selectively
 (A) moving said comparison means to a first comparison position wherein said first holding means is in alignment with said chute to capture a first slide in said first holding means and
 (B) moving said comparison means to a second comparison position wherein said second holding means is in alignment with said chute to capture a second slide in said second holding means.

10. The combination in accordance with claim 1 wherein said turntable having a plurality of slide receptacles thereon includes a circular wheel having a plurality of slide bins thereon.

11. The combination in accordance with claim 1 wherein said third means includes
 means for moving said turntable to a home-limit position;
 generating means for generating a position signal indicative of a particular position of said turntable relative to said home-limit position; and,
 means for indexing said turntable from said home-limit position to said particular position in accordance with the generated position signal to position one particular slide receptacle of said slide receptacles in accordance with said sorting algorithm.

12. The combination in accordance with claim 1 wherein at least one slide receptacle of said plurality of slide receptacles has affixed thereto a electronically readable code, said combination further comprising:
 a code-reading station located so as to be in a position to read said code as said turntable is moved by said third means, said code reading station including means for generating a code signal corresponding to said electronically readable code;
 said third means including control means for utilizing said code signal in said sorting algorithm to index said turntable to said at least one slide receptacle of said slide receptacles in accordance with said sorting algorithm.

13. The combination in accordance with claim 12 further comprising:
 means connected to said third means, for utilizing said code signal in conjunction with said updated accession number to produce a record, which record indicates that said one slide is stored in said at least slide receptacle.

14. A slide sorter comprising:
 a movable turntable adapted to receive either
 (A) a circular tray having a plurality of first slide receptacles thereon, said first slide receptacles being adapted to receive and store slides vertically, or
 (B) a bin wheel having a plurality of second slide receptacles thereon, said second slide receptacles being adapted to receive and store slides horizontally;
 first means for holding a group of slides above said turntable, said first means including releasing means for releasing slides from said group one by one and delivering means for delivering one slide released from said group of slides to a position above said turntable;
 dual-mode means, settable to a first position and a second position, for allowing slides to drop into said first slide receptacles when set to said first position and for allowing slides to drop into said second slide receptacles when set to said second position; and
 means for activating said releasing means so that said one slide is delivered by said delivery means to said position above said turntable, and thence into one of said first receptacles when said dual-mode means is set to said first position and into one of said second receptacles when said dual-mode means is set to said second position.

15. The combination in accordance with claim 14 further comprising:
 second means for deriving an accession number for said one slide that is delivered by said delivering means; and,
 third means responsive to said second means for utilizing said accession number in accordance with a sorting algorithm to move said turntable to locate a particular slide receptacle relative to said position above said turntable.

16. The combination in accordance with claim 15 wherein said means for deriving an accession number for said slide includes means for reading a slide identification code affixed to said slide and means for causing a read error indication upon the condition that said slide identification code is incorrectly read.

17. The combination in accordance with claim 15 wherein:
 said first means for holding a group of slides above said turntable includes means for receiving a bin, said bin having a bin label affixed thereon, and,
 said means for deriving an accession number for said one slide includes
 means for reading said bin label affixed to said bin, and,
 means for associating a slide in said group of slides with an accession number which utilizes said bin label to recall the accession number which uniquely identifies a slide based upon the relative position of said slide in said group of slides in said bin.

18. The combination in accordance with claim 15 wherein said third means includes
 means for moving said turntable to a home-limit position;
 generating means for generating a position signal indicative of a particular position of said turntable relative to said home-limit position; and,
 means for indexing said turntable from said home-limit position to said particular position in accordance with the generated position signal to position one particular slide receptacle of said slide receptacles in accordance with said sorting algorithm.

19. The combination in accordance with claim 18 further comprising:
means connected to said third means, for utilizing said position signal in conjunction with said accession number to produce a record, which record indicates that said one slide is stored in said one particular slide receptacle.

20. The combination in accordance with claim 15 wherein at least one second slide receptacle of said plurality of second slide receptacles has affixed thereto an electronically readable code, said combination further comprising:
a code-reading station located so as to be in a position to read said code as said turntable is moved by said third means, said code reading station including means for generating a code signal corresponding to said electronically readable code;
said third means including control means for utilizing said code signal in said sorting algorithm to index said turntable to said at least one second slide receptacle of said plurality of second slide receptacles in accordance with said sorting algorithm.

21. The combination in accordance with claim 14 wherein said circular tray is a circular slide tray wherein said plurality of first slide receptacles are the individual vertical compartments of said slide tray.

22. The combination in accordance with claim 14 wherein said bin wheel includes a circular wheel having a plurality of slide bins thereon.

23. The combination in accordance with claim 14 wherein said turntable having a plurality of slide receptacles thereon includes a circular wheel adapted to receive a plurality of bins at a plurality of bin positions around the periphery thereof,
said bins being of such size and dimensions as to receive and hold slides therein in a stack, with one slide stacked upon another; and
said position above said turntable comprises an index point of said turntable;
said third means includes means for causing said turntable to rotate to thereby move a selected one of said bins to said index point, said one bin being located below said position above said turntable when at said index point.

24. A slide sorter comprising:
a movable turntable having a plurality of slide receptacles thereon;
first means for holding a group of slides above said turntable, said first means including releasing means for releasing slides from said group one by one and delivering means for delivering one slide released from said group of slides to a position above said turntable;
second means including means for associating a slide in said group of slides with a previously derived accession number uniquely identifying said slide, said second means further including means for deriving an updated accession number for said one slide that is delivered by said delivering means;
third means responsive to said second means for utilizing said updated accession number in accordance with a sorting algorithm to move said turntable to locate a particular slide receptacle relative to said position above said turntable;
fourth means for activating said releasing means so that said one slide is delivered by said delivery means to said position above said turntable, and thence into said receptacle;
said turntable having a plurality of slide receptacles thereon including a circular wheel adapted to receive a plurality of bins at a plurality of bin positions around the periphery thereof,
said bins being of such size and dimensions as to receive and hold slides therein in a stack, with one slide stacked upon another; and
said position above said turntable comprises an index point of said turntable;
said third means including means for causing said turntable to rotate to thereby move a selected one of said bins to said index point, said one bin being located below said position above said turntable when at said index point.

25. A method of storing a particular slide of a plurality of slides into a particular one of a plurality of slide storage receptacles on a movable table comprising the steps of:
A. holding slides in a predetermined order in a slide hopper, such that a first number can be generated that distinguishes a particular slide from others of slides as slides are removed from said hopper;
B. moving said table to a home-limit position such that a second number can be generated indicative of the position of said particular slide storage receptacle relative to said home-limit position;
C. generating said first number indicative of the position of said particular slide relative to other slides in said slide hopper;
D. generating said second number indicative of the position of said particular slide storage receptacle relative to said home-limit position;
E. utilizing said first number in a sorting logic to index said table from said home-limit position to the position of said one particular storage receptacle of said storage receptacles in accordance with a prescribed sorting agenda; and,
F. causing said particular slide to be placed in said one particular storage receptacle.

26. The method in accordance with claim 25 further comprising the steps of:
G. affixing to a slide bin a first electronically readable code that can be used to generate an accession number for distinguishing said particular slide from others of said slides in said bin;
H. affixing to said particular one of said slide storage receptacles a second electronically readable code;
I. reading said first electronically readable code as said bin engages a first code-reading station to thereby produce a first signal;
J. reading said second electronically readable code as said table is positioned with respect to a second code-reading station to thereby produce said second number;
K. utilizing said first signal in a sorting logic to index said table from said home-limit position to the position of said one particular slide storage receptacle of said slide storage receptacles in accordance with a prescribed sorting agenda; and,
L. storing said particular slide in said one particular slide storage receptacle.

27. The method in accordance with claim 25 further comprising the step of:
G. utilizing said second number in conjunction with said first number to produce a record indicating that said particular slide is stored in said one particular slide storage receptacle.

* * * * *